(12) United States Patent
Wykes et al.

(10) Patent No.: US 9,606,704 B2
(45) Date of Patent: *Mar. 28, 2017

(54) ALTERNATIVE INPUTS OF A MOBILE COMMUNICATIONS DEVICE

(71) Applicant: Microsoft Technology Licensing, LLC, Redmond, WA (US)

(72) Inventors: David Henry Wykes, Seattle, WA (US); Catherine Sayim Kim, Seattle, WA (US); Audrey Louchart, Seattle, WA (US); Michael J. Kruzeniski, Sausalito, CA (US); Kathleen W. Holmes, Seattle, WA (US); Jonathan D. Friedman, Mercer Island, WA (US); Joseph P. Marquardt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,002

(22) Filed: Feb. 23, 2015

(65) Prior Publication Data

US 2015/0169079 A1 Jun. 18, 2015

Related U.S. Application Data

(63) Continuation of application No. 14/330,221, filed on Jul. 14, 2014, now Pat. No. 8,970,499, which is a (Continued)

(51) Int. Cl.
*G06F 3/02* (2006.01)
*G06F 3/0482* (2013.01)
(Continued)

(52) U.S. Cl.
CPC .......... *G06F 3/0482* (2013.01); *G06F 3/0219* (2013.01); *G06F 3/0227* (2013.01);
(Continued)

(58) Field of Classification Search
CPC ..... G06F 3/0202; H04W 72/04; H04W 8/245; H04W 4/02; H04W 64/00
(Continued)

(56) References Cited

U.S. PATENT DOCUMENTS

| 4,823,283 A | 4/1989 | Diehm et al. |
| 5,045,997 A | 9/1991 | Watanabe |

(Continued)

FOREIGN PATENT DOCUMENTS

| CA | 2363978 | 5/2003 |
| CN | 1749936 | 3/2006 |

(Continued)

OTHER PUBLICATIONS

"Notice of Allowance", U.S. Appl. No. 13/461,656, Aug. 24, 2015, 4 pages.

(Continued)

*Primary Examiner* — Joseph Lauture

(57) ABSTRACT

In an implementation, a mobile communications device includes a display device having touchscreen functionality, a keyboard having a plurality of physical keys that include a dedicated key and letter keys arranged according to a QWERTY layout, and one or more modules. The one or more modules are configured to output a user interface on the display device responsive to selection of the dedicated key, the user interface having a plurality of portions that are selectable via the touchscreen functionality to cause input of a respective one of a plurality of emoticons.

20 Claims, 7 Drawing Sheets

Related U.S. Application Data continuation of application No. 13/270,111, filed on Oct. 10, 2011, now Pat. No. 8,781,533, which is a continuation of application No. 12/414,458, filed on Mar. 30, 2009, now Pat. No. 8,086,275.

(60) Provisional application No. 61/107,945, filed on Oct. 23, 2008, provisional application No. 61/107,935, filed on Oct. 23, 2008, provisional application No. 61/107,921, filed on Oct. 23, 2008.

(51) Int. Cl.
| | |
|---|---|
| *G06F 3/0488* | (2013.01) |
| *G06F 17/30* | (2006.01) |
| *G06Q 30/04* | (2012.01) |
| *G06Q 30/06* | (2012.01) |
| *H04M 1/725* | (2006.01) |
| *G06F 3/041* | (2006.01) |
| *G06F 3/0485* | (2013.01) |
| *G06F 3/023* | (2006.01) |
| *G06F 3/044* | (2006.01) |
| *H04W 4/02* | (2009.01) |
| *H04W 8/24* | (2009.01) |
| *H04W 64/00* | (2009.01) |
| *H04W 72/04* | (2009.01) |

(52) U.S. Cl.
CPC ............ *G06F 3/0236* (2013.01); *G06F 3/041* (2013.01); *G06F 3/044* (2013.01); *G06F 3/0412* (2013.01); *G06F 3/0485* (2013.01); *G06F 3/0488* (2013.01); *G06F 3/04883* (2013.01); *G06F 17/30864* (2013.01); *G06F 17/30867* (2013.01); *G06Q 30/04* (2013.01); *G06Q 30/0601* (2013.01); *H04M 1/7258* (2013.01); *H04M 1/72569* (2013.01); *H04M 1/72583* (2013.01); *G06F 3/0202* (2013.01); *G06F 2203/04807* (2013.01); *H04W 4/02* (2013.01); *H04W 8/245* (2013.01); *H04W 64/00* (2013.01); *H04W 72/04* (2013.01)

(58) Field of Classification Search
USPC ........... 345/168; 455/566, 456.1, 456.3, 418, 455/450, 561, 466, 557
See application file for complete search history.

(56) References Cited

U.S. PATENT DOCUMENTS

| | | |
|---|---|---|
| 5,046,001 A | 9/1991 | Barker et al. |
| 5,189,732 A | 2/1993 | Kondo |
| 5,258,748 A | 11/1993 | Jones |
| 5,297,032 A | 3/1994 | Trojan et al. |
| 5,321,750 A | 6/1994 | Nadan |
| 5,339,392 A | 8/1994 | Risberg et al. |
| 5,404,442 A | 4/1995 | Foster et al. |
| 5,432,932 A | 7/1995 | Chen et al. |
| 5,463,725 A | 10/1995 | Henckel et al. |
| 5,485,197 A | 1/1996 | Hoarty |
| 5,495,566 A | 2/1996 | Kwatinetz |
| 5,515,495 A | 5/1996 | Ikemoto |
| 5,574,836 A | 11/1996 | Broemmelsiek |
| 5,598,523 A | 1/1997 | Fujita |
| 5,611,060 A | 3/1997 | Belfiore et al. |
| 5,623,613 A | 4/1997 | Rowe et al. |
| 5,640,176 A | 6/1997 | Mundt et al. |
| 5,650,827 A | 7/1997 | Tsumori et al. |
| 5,657,049 A | 8/1997 | Ludolph et al. |
| 5,675,329 A | 10/1997 | Barker |
| 5,687,331 A | 11/1997 | Volk et al. |
| 5,712,995 A | 1/1998 | Cohn |
| 5,754,178 A | 5/1998 | Johnston, Jr. et al. |
| 5,771,042 A | 6/1998 | Santos-Gomez |
| 5,793,415 A | 8/1998 | Gregory et al. |
| 5,819,284 A | 10/1998 | Farber et al. |
| 5,860,073 A | 1/1999 | Ferrel et al. |
| 5,905,492 A | 5/1999 | Straub et al. |
| 5,914,720 A | 6/1999 | Maples et al. |
| 5,940,076 A | 8/1999 | Sommers et al. |
| 5,959,621 A | 9/1999 | Nawaz et al. |
| 5,963,204 A | 10/1999 | Ikeda et al. |
| 6,008,809 A | 12/1999 | Brooks |
| 6,008,816 A | 12/1999 | Eisler |
| 6,009,519 A | 12/1999 | Jones et al. |
| 6,011,542 A | 1/2000 | Durrani et al. |
| 6,028,600 A | 2/2000 | Rosin et al. |
| 6,057,839 A | 5/2000 | Advani et al. |
| 6,064,383 A | 5/2000 | Skelly |
| 6,104,418 A | 8/2000 | Tanaka et al. |
| 6,108,003 A | 8/2000 | Hall, Jr. et al. |
| 6,111,585 A | 8/2000 | Choi |
| 6,115,040 A | 9/2000 | Bladow et al. |
| 6,166,736 A | 12/2000 | Hugh |
| 6,184,879 B1 | 2/2001 | Minemura et al. |
| 6,188,405 B1 | 2/2001 | Czerwinski et al. |
| 6,211,921 B1 | 4/2001 | Cherian et al. |
| 6,212,564 B1 | 4/2001 | Harter et al. |
| 6,216,141 B1 | 4/2001 | Straub et al. |
| 6,266,098 B1 | 7/2001 | Cove et al. |
| 6,278,448 B1 | 8/2001 | Brown et al. |
| 6,281,940 B1 | 8/2001 | Sciammarella |
| 6,311,058 B1 | 10/2001 | Wecker et al. |
| 6,317,142 B1 | 11/2001 | Decoste et al. |
| 6,369,837 B1 | 4/2002 | Schirmer |
| 6,385,630 B1 | 5/2002 | Ejerhed |
| 6,396,963 B2 | 5/2002 | Shaffer |
| 6,411,307 B1 | 6/2002 | Rosin et al. |
| 6,424,338 B1 | 7/2002 | Andersone |
| 6,426,753 B1 | 7/2002 | Migdal |
| 6,433,789 B1 | 8/2002 | Rosman |
| 6,448,987 B1 | 9/2002 | Easty et al. |
| 6,449,638 B1 | 9/2002 | Wecker et al. |
| 6,456,334 B1 | 9/2002 | Duhault |
| 6,489,977 B2 | 12/2002 | Sone |
| 6,505,243 B1 | 1/2003 | Lortz |
| 6,507,643 B1 | 1/2003 | Groner |
| 6,510,144 B1 | 1/2003 | Dommety et al. |
| 6,510,466 B1 | 1/2003 | Cox et al. |
| 6,510,553 B1 | 1/2003 | Hazra |
| 6,538,635 B1 | 3/2003 | Ringot |
| 6,570,582 B1 | 5/2003 | Sciammarella et al. |
| 6,570,597 B1 | 5/2003 | Seki et al. |
| 6,577,323 B1 | 6/2003 | Jamieson et al. |
| 6,577,350 B1 | 6/2003 | Proehl et al. |
| 6,591,244 B2 | 7/2003 | Jim et al. |
| 6,597,374 B1 | 7/2003 | Baker et al. |
| 6,628,309 B1 | 9/2003 | Dodson et al. |
| 6,629,793 B1 | 10/2003 | Miller |
| 6,636,246 B1 | 10/2003 | Gallo et al. |
| 6,642,944 B2 | 11/2003 | Conrad et al. |
| 6,662,023 B1 | 12/2003 | Helle |
| 6,690,387 B2 | 2/2004 | Zimmerman et al. |
| 6,697,825 B1 | 2/2004 | Underwood et al. |
| 6,707,449 B2 | 3/2004 | Hinckley et al. |
| 6,710,771 B1 | 3/2004 | Yamaguchi et al. |
| 6,721,958 B1 | 4/2004 | Dureau |
| 6,724,403 B1 | 4/2004 | Santoro et al. |
| 6,784,925 B1 | 8/2004 | Tomat et al. |
| 6,798,421 B2 | 9/2004 | Baldwin |
| 6,801,203 B1 | 10/2004 | Hussain |
| 6,807,558 B1 | 10/2004 | Hassett et al. |
| 6,832,355 B1 | 12/2004 | Duperrouzel et al. |
| 6,857,104 B1 | 2/2005 | Cahn |
| 6,865,297 B2 | 3/2005 | Loui |
| 6,873,329 B2 | 3/2005 | Cohen et al. |
| 6,876,312 B2 | 4/2005 | Yu |
| 6,885,974 B2 | 4/2005 | Holle |
| 6,904,597 B2 | 6/2005 | Jin |
| 6,920,445 B2 | 7/2005 | Bae |
| 6,938,101 B2 | 8/2005 | Hayes et al. |
| 6,961,731 B2 | 11/2005 | Holbrook |

(56) References Cited

U.S. PATENT DOCUMENTS

| | | |
|---|---|---|
| 6,972,776 B2 | 12/2005 | Davis et al. |
| 6,975,306 B2 | 12/2005 | Hinckley |
| 6,976,210 B1 | 12/2005 | Silva et al. |
| 6,978,303 B1 | 12/2005 | McCreesh et al. |
| 6,983,310 B2 | 1/2006 | Rouse |
| 6,987,991 B2 | 1/2006 | Nelson |
| 7,007,238 B2 | 2/2006 | Glaser |
| 7,013,041 B2 | 3/2006 | Miyamoto |
| 7,017,119 B1 | 3/2006 | Johnston et al. |
| 7,019,757 B2 | 3/2006 | Brown et al. |
| 7,028,264 B2 | 4/2006 | Santoro et al. |
| 7,032,187 B2 | 4/2006 | Keely, Jr. et al. |
| 7,036,090 B1 | 4/2006 | Nguyen |
| 7,036,091 B1 | 4/2006 | Nguyen |
| 7,042,460 B2 | 5/2006 | Hussain et al. |
| 7,051,291 B2 | 5/2006 | Sciammarella et al. |
| 7,058,955 B2 | 6/2006 | Porkka |
| 7,065,385 B2 | 6/2006 | Jarrad et al. |
| 7,065,386 B1 | 6/2006 | Smethers |
| 7,075,535 B2 | 7/2006 | Aguera y Arcas |
| 7,089,507 B2 | 8/2006 | Lection et al. |
| 7,091,998 B2 | 8/2006 | Miller-Smith |
| 7,093,201 B2 | 8/2006 | Duarte |
| 7,106,349 B2 | 9/2006 | Baar et al. |
| 7,111,044 B2 | 9/2006 | Lee |
| 7,133,707 B1 | 11/2006 | Rak |
| 7,133,859 B1 | 11/2006 | Wong |
| 7,139,800 B2 | 11/2006 | Bellotti et al. |
| 7,146,573 B2 | 12/2006 | Brown et al. |
| 7,155,729 B1 | 12/2006 | Andrew et al. |
| 7,158,123 B2 | 1/2007 | Myers et al. |
| 7,158,135 B2 | 1/2007 | Santodomingo et al. |
| 7,178,111 B2 | 2/2007 | Glein et al. |
| 7,197,702 B2 | 3/2007 | Niyogi et al. |
| 7,210,099 B2 | 4/2007 | Rohrabaugh et al. |
| 7,213,079 B2 | 5/2007 | Narin |
| 7,216,588 B2 | 5/2007 | Suess |
| 7,249,326 B2 | 7/2007 | Stoakley et al. |
| 7,262,775 B2 | 8/2007 | Calkins et al. |
| 7,263,668 B1 | 8/2007 | Lentz |
| 7,280,097 B2 | 10/2007 | Chen |
| 7,283,620 B2 | 10/2007 | Adamczyk |
| 7,289,806 B2 | 10/2007 | Morris et al. |
| 7,296,184 B2 | 11/2007 | Derks et al. |
| 7,296,242 B2 | 11/2007 | Agata et al. |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,369,647 B2 | 5/2008 | Gao et al. |
| 7,376,907 B2 | 5/2008 | Santoro et al. |
| 7,386,807 B2 | 6/2008 | Cummins et al. |
| 7,388,578 B2 | 6/2008 | Tao |
| 7,403,191 B2 | 7/2008 | Sinclair |
| 7,408,538 B2 | 8/2008 | Hinckley et al. |
| 7,433,920 B2 | 10/2008 | Blagsvedt et al. |
| 7,447,520 B2 | 11/2008 | Scott |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,487,467 B1 | 2/2009 | Kawahara et al. |
| 7,496,830 B2 | 2/2009 | Rubin |
| 7,512,966 B2 | 3/2009 | Lyons, Jr. et al. |
| 7,577,918 B2 | 8/2009 | Lindsay |
| 7,581,034 B2 | 8/2009 | Polivy et al. |
| 7,593,995 B1 | 9/2009 | He et al. |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,106 B2 | 10/2009 | Ernst et al. |
| 7,610,563 B2 | 10/2009 | Nelson et al. |
| 7,614,018 B1 | 11/2009 | Ohazama et al. |
| 7,619,615 B1 | 11/2009 | Donoghue |
| 7,640,518 B2 | 12/2009 | Forlines et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,671,756 B2 | 3/2010 | Herz et al. |
| 7,681,138 B2 | 3/2010 | Grasser et al. |
| 7,702,683 B1 | 4/2010 | Kirshenbaum |
| 7,730,425 B2 | 6/2010 | de los Reyes et al. |
| 7,746,388 B2 | 6/2010 | Jeon |
| 7,755,674 B2 | 7/2010 | Kaminaga |
| 7,782,332 B2 | 8/2010 | Nagata |
| 7,782,339 B1 | 8/2010 | Hobbs et al. |
| 7,792,876 B2 | 9/2010 | Easwar |
| 7,834,861 B2 | 11/2010 | Lee |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,903,115 B2 | 3/2011 | Platzer et al. |
| 7,924,271 B2 | 4/2011 | Christie et al. |
| 7,933,632 B2 | 4/2011 | Flynt et al. |
| 7,962,281 B2 | 6/2011 | Rasmussen et al. |
| 7,983,718 B1 | 7/2011 | Roka |
| 7,987,431 B2 | 7/2011 | Santoro et al. |
| 8,006,276 B2 | 8/2011 | Nakagawa et al. |
| 8,074,174 B2 | 12/2011 | Suzuki et al. |
| 8,086,275 B2 | 12/2011 | Wykes |
| 8,108,781 B2 | 1/2012 | Laansoo et al. |
| 8,127,254 B2 | 2/2012 | Lindberg et al. |
| 8,130,226 B2 | 3/2012 | Brunner et al. |
| 8,131,808 B2 | 3/2012 | Aoki et al. |
| 8,150,924 B2 | 4/2012 | Buchheit et al. |
| 8,175,653 B2 | 5/2012 | Smuga |
| 8,200,779 B2 | 6/2012 | Wei et al. |
| 8,225,193 B1 | 7/2012 | Kleinschnitz et al. |
| 8,238,526 B1 | 8/2012 | Seth et al. |
| 8,238,876 B2 | 8/2012 | Teng |
| 8,245,152 B2 | 8/2012 | Brunner et al. |
| 8,250,494 B2 | 8/2012 | Butcher et al. |
| 8,255,473 B2 | 8/2012 | Eren et al. |
| 8,255,812 B1 | 8/2012 | Parparita et al. |
| 8,266,550 B1 | 9/2012 | Cleron et al. |
| 8,269,736 B2 | 9/2012 | Wilairat |
| 8,280,901 B2 | 10/2012 | McDonald |
| 8,289,688 B2 | 10/2012 | Behar et al. |
| 8,294,715 B2 | 10/2012 | Patel et al. |
| 8,299,943 B2 | 10/2012 | Longe |
| 8,355,698 B2 | 1/2013 | Teng et al. |
| 8,385,952 B2 | 2/2013 | Friedman et al. |
| 8,411,046 B2 | 4/2013 | Kruzeniski et al. |
| 8,429,565 B2 | 4/2013 | Agarawala et al. |
| 8,448,083 B1 | 5/2013 | Migos et al. |
| 8,548,431 B2 | 10/2013 | Teng et al. |
| 8,564,461 B2 | 10/2013 | Rubanovich et al. |
| 8,634,876 B2 | 1/2014 | Friedman |
| 8,781,533 B2 | 7/2014 | Wykes et al. |
| 8,892,170 B2 | 11/2014 | Teng et al. |
| 8,914,072 B2 | 12/2014 | Smuga et al. |
| 8,970,499 B2 * | 3/2015 | Wykes ............... G06F 3/0482 345/168 |
| 9,218,067 B2 | 12/2015 | Kruzeniski et al. |
| 9,223,411 B2 | 12/2015 | Butcher et al. |
| 9,323,424 B2 | 4/2016 | Kruzeniski et al. |
| 2001/0015721 A1 | 8/2001 | Byun et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0026349 A1 | 2/2002 | Reilly et al. |
| 2002/0035607 A1 | 3/2002 | Checkoway |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0091755 A1 | 7/2002 | Narin |
| 2002/0115476 A1 | 8/2002 | Padawer et al. |

(56) References Cited

U.S. PATENT DOCUMENTS

| | | |
|---|---|---|
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0152305 A1 | 10/2002 | Jackson et al. |
| 2002/0154176 A1 | 10/2002 | Barksdale et al. |
| 2002/0161634 A1 | 10/2002 | Kaars |
| 2002/0186251 A1 | 12/2002 | Himmel et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0020671 A1 | 1/2003 | Santoro et al. |
| 2003/0040300 A1 | 2/2003 | Bodic |
| 2003/0046396 A1 | 3/2003 | Richter et al. |
| 2003/0073414 A1 | 4/2003 | Capps |
| 2003/0076364 A1 | 4/2003 | Martinez et al. |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2003/0234799 A1 | 12/2003 | Lee |
| 2004/0015553 A1 | 1/2004 | Griffin et al. |
| 2004/0066414 A1 | 4/2004 | Czerwinski et al. |
| 2004/0068543 A1 | 4/2004 | Seifert |
| 2004/0078299 A1 | 4/2004 | Down-Logan |
| 2004/0111673 A1 | 6/2004 | Bowman et al. |
| 2004/0137884 A1 | 7/2004 | Engstrom et al. |
| 2004/0185883 A1 | 9/2004 | Rukman |
| 2004/0212586 A1 | 10/2004 | Denny |
| 2004/0217954 A1 | 11/2004 | O'Gorman et al. |
| 2004/0237048 A1 | 11/2004 | Tojo et al. |
| 2004/0250217 A1 | 12/2004 | Tojo et al. |
| 2005/0005241 A1 | 1/2005 | Hunleth et al. |
| 2005/0028208 A1 | 2/2005 | Ellis |
| 2005/0044058 A1 | 2/2005 | Matthews et al. |
| 2005/0054384 A1 | 3/2005 | Pasquale et al. |
| 2005/0060647 A1 | 3/2005 | Doan et al. |
| 2005/0060665 A1 | 3/2005 | Rekimoto |
| 2005/0079896 A1 | 4/2005 | Kokko |
| 2005/0085215 A1 | 4/2005 | Kokko et al. |
| 2005/0085272 A1 | 4/2005 | Anderson et al. |
| 2005/0108655 A1 | 5/2005 | Andrea et al. |
| 2005/0114788 A1 | 5/2005 | Fabritius |
| 2005/0143138 A1 | 6/2005 | Lee et al. |
| 2005/0179654 A1 | 8/2005 | Hawkins |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0198584 A1 | 9/2005 | Matthews et al. |
| 2005/0200762 A1 | 9/2005 | Barletta et al. |
| 2005/0216300 A1 | 9/2005 | Appelman et al. |
| 2005/0223057 A1 | 10/2005 | Buchheit et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0005207 A1 | 1/2006 | Louch et al. |
| 2006/0010394 A1 | 1/2006 | Chaudhri et al. |
| 2006/0015736 A1 | 1/2006 | Callas et al. |
| 2006/0015812 A1 | 1/2006 | Cunningham |
| 2006/0025220 A1 | 2/2006 | Macauley et al. |
| 2006/0026013 A1 | 2/2006 | Kraft |
| 2006/0026521 A1 | 2/2006 | Hotelling et al. |
| 2006/0036425 A1 | 2/2006 | Le Cocq et al. |
| 2006/0048073 A1 | 3/2006 | Jarrett et al. |
| 2006/0048101 A1 | 3/2006 | Krassovsky et al. |
| 2006/0059430 A1 | 3/2006 | Bells |
| 2006/0070005 A1 | 3/2006 | Gilbert et al. |
| 2006/0070007 A1 | 3/2006 | Cummins et al. |
| 2006/0074735 A1 | 4/2006 | Shukla et al. |
| 2006/0074771 A1 | 4/2006 | Kim |
| 2006/0103623 A1 | 5/2006 | Davis |
| 2006/0112354 A1 | 5/2006 | Park et al. |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0172724 A1 | 8/2006 | Linkert et al. |
| 2006/0173911 A1 | 8/2006 | Levin et al. |
| 2006/0184901 A1 | 8/2006 | Dietz |
| 2006/0190833 A1 | 8/2006 | SanGiovanni et al. |
| 2006/0199598 A1 | 9/2006 | Lee et al. |
| 2006/0206590 A1 | 9/2006 | Wakasa et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0246955 A1 | 11/2006 | Nirhamo |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LeVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0035513 A1 | 2/2007 | Sherrard et al. |
| 2007/0038567 A1 | 2/2007 | Allaire et al. |
| 2007/0050337 A1 | 3/2007 | Venkataraman et al. |
| 2007/0050724 A1 | 3/2007 | Lee et al. |
| 2007/0054679 A1 | 3/2007 | Cho et al. |
| 2007/0061306 A1 | 3/2007 | Pell et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0073718 A1 | 3/2007 | Ramer |
| 2007/0076013 A1 | 4/2007 | Campbell |
| 2007/0079249 A1 | 4/2007 | Pall et al. |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083821 A1 | 4/2007 | Garbow et al. |
| 2007/0106635 A1 | 5/2007 | Frieden et al. |
| 2007/0118801 A1 | 5/2007 | Harshbarger et al. |
| 2007/0120835 A1 | 5/2007 | Sato |
| 2007/0127638 A1 | 6/2007 | Doulton |
| 2007/0150826 A1 | 6/2007 | Anzures et al. |
| 2007/0150842 A1 | 6/2007 | Chaudhri et al. |
| 2007/0157089 A1 | 7/2007 | Van Os et al. |
| 2007/0162850 A1 | 7/2007 | Adler et al. |
| 2007/0171192 A1 | 7/2007 | Seo et al. |
| 2007/0171238 A1 | 7/2007 | Ubillos et al. |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192708 A1 | 8/2007 | Lee et al. |
| 2007/0192730 A1 | 8/2007 | Simila et al. |
| 2007/0192733 A1 | 8/2007 | Horiuchi |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214422 A1 | 9/2007 | Agarwal et al. |
| 2007/0214429 A1 | 9/2007 | Lyudovyk et al. |
| 2007/0216651 A1 | 9/2007 | Patel |
| 2007/0216661 A1 | 9/2007 | Chen et al. |
| 2007/0225022 A1 | 9/2007 | Satake |
| 2007/0232342 A1 | 10/2007 | Larocca |
| 2007/0233654 A1 | 10/2007 | Karlson et al. |

(56) References Cited

U.S. PATENT DOCUMENTS

| | | |
|---|---|---|
| 2007/0236468 A1 | 10/2007 | Tuli |
| 2007/0238488 A1 | 10/2007 | Scott |
| 2007/0238489 A1 | 10/2007 | Scott |
| 2007/0247435 A1 | 10/2007 | Benko et al. |
| 2007/0250583 A1 | 10/2007 | Hardy |
| 2007/0250795 A1 | 10/2007 | Park |
| 2007/0253758 A1 | 11/2007 | Suess |
| 2007/0255831 A1 | 11/2007 | Hayashi et al. |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0273668 A1 | 11/2007 | Park et al. |
| 2007/0280457 A1 | 12/2007 | Aberethy |
| 2007/0281747 A1 | 12/2007 | Pletikosa |
| 2007/0294294 A1 | 12/2007 | Aarnio et al. |
| 2008/0005668 A1 | 1/2008 | Mavinkurve |
| 2008/0009272 A1 | 1/2008 | Toledano |
| 2008/0028294 A1 | 1/2008 | Sell et al. |
| 2008/0032681 A1 | 2/2008 | West |
| 2008/0036743 A1 | 2/2008 | Westerman et al. |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0066010 A1 | 3/2008 | Brodersen et al. |
| 2008/0068447 A1 | 3/2008 | Mattila et al. |
| 2008/0072173 A1 | 3/2008 | Brunner et al. |
| 2008/0076472 A1 | 3/2008 | Hyatt |
| 2008/0082934 A1 | 4/2008 | Kocienda et al. |
| 2008/0084970 A1 | 4/2008 | Harper |
| 2008/0085700 A1 | 4/2008 | Arora |
| 2008/0092054 A1 | 4/2008 | Bhumkar et al. |
| 2008/0092057 A1 | 4/2008 | Monson et al. |
| 2008/0094370 A1 | 4/2008 | Ording et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0113656 A1 | 5/2008 | Lee et al. |
| 2008/0114535 A1 | 5/2008 | Nesbitt |
| 2008/0120571 A1 | 5/2008 | Chang et al. |
| 2008/0122796 A1 | 5/2008 | Jobs |
| 2008/0132252 A1 | 6/2008 | Altman et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0155437 A1 | 6/2008 | Morris |
| 2008/0162651 A1 | 7/2008 | Madnani |
| 2008/0163104 A1 | 7/2008 | Haug |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0167058 A1 | 7/2008 | Lee et al. |
| 2008/0168290 A1 | 7/2008 | Jobs et al. |
| 2008/0168349 A1 | 7/2008 | Lamiraux et al. |
| 2008/0168379 A1 | 7/2008 | Forstall et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0198141 A1 | 8/2008 | Lee et al. |
| 2008/0200142 A1 | 8/2008 | Adbel-Kader et al. |
| 2008/0208973 A1 | 8/2008 | Hayashi |
| 2008/0215980 A1 | 9/2008 | Lee et al. |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0242362 A1 | 10/2008 | Duarte |
| 2008/0244447 A1 | 10/2008 | Sagar |
| 2008/0250035 A1 | 10/2008 | Smith et al. |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0295017 A1 | 11/2008 | Tseng et al. |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307351 A1 | 12/2008 | Louch et al. |
| 2008/0307364 A1 | 12/2008 | Chaudhri et al. |
| 2008/0309626 A1 | 12/2008 | Westerman et al. |
| 2008/0316177 A1 | 12/2008 | Tseng |
| 2008/0317240 A1 | 12/2008 | Chang et al. |
| 2008/0320413 A1 | 12/2008 | Oshiro |
| 2009/0002332 A1 | 1/2009 | Park et al. |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0019369 A1 | 1/2009 | Borovsky et al. |
| 2009/0024926 A1 | 1/2009 | Morotomi |
| 2009/0029736 A1 | 1/2009 | Kim et al. |
| 2009/0031247 A1 | 1/2009 | Walter et al. |
| 2009/0037413 A1 | 2/2009 | Castell et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0058882 A1 | 3/2009 | Adachi et al. |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0070695 A1 | 3/2009 | Oh et al. |
| 2009/0077649 A1 | 3/2009 | Lockhart |
| 2009/0083656 A1 | 3/2009 | Dukhon |
| 2009/0083850 A1 | 3/2009 | Fadell et al. |
| 2009/0085851 A1 | 4/2009 | Lim |
| 2009/0085878 A1 | 4/2009 | Heubel |
| 2009/0089215 A1 | 4/2009 | Newton |
| 2009/0094562 A1 | 4/2009 | Jeong et al. |
| 2009/0103515 A1 | 4/2009 | Pointer |
| 2009/0106694 A1 | 4/2009 | Kraft et al. |
| 2009/0106696 A1 | 4/2009 | Duarte |
| 2009/0109184 A1 | 4/2009 | Kim et al. |
| 2009/0109243 A1 | 4/2009 | Kraft |
| 2009/0111447 A1 | 4/2009 | Nurmi |
| 2009/0117942 A1 | 5/2009 | Boningue et al. |
| 2009/0119606 A1 | 5/2009 | Gilbert |
| 2009/0140061 A1 | 6/2009 | Schultz et al. |
| 2009/0140986 A1 | 6/2009 | Karkkainen et al. |
| 2009/0144642 A1 | 6/2009 | Crystal |
| 2009/0144653 A1 | 6/2009 | Ubillos |
| 2009/0146962 A1 | 6/2009 | Ahonen et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0170480 A1 | 7/2009 | Lee |
| 2009/0178007 A1 | 7/2009 | Matas et al. |
| 2009/0182788 A1 | 7/2009 | Chung et al. |
| 2009/0184939 A1 | 7/2009 | Wohlstadter et al. |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |

(56) References Cited

U.S. PATENT DOCUMENTS

| | | |
|---|---|---|
| 2009/0249257 A1 | 10/2009 | Bove et al. |
| 2009/0259966 A1 | 10/2009 | Hara |
| 2009/0259971 A1 | 10/2009 | Rankine et al. |
| 2009/0265662 A1 | 10/2009 | Bamford |
| 2009/0271778 A1 | 10/2009 | Mandyam et al. |
| 2009/0284482 A1 | 11/2009 | Chin |
| 2009/0288032 A1 | 11/2009 | Chang et al. |
| 2009/0288044 A1 | 11/2009 | Matthews et al. |
| 2009/0292989 A1 | 11/2009 | Matthews et al. |
| 2009/0293007 A1 | 11/2009 | Duarte et al. |
| 2009/0293014 A1 | 11/2009 | Meuninck et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0328101 A1 | 12/2009 | Suomela et al. |
| 2010/0008490 A1 | 1/2010 | Gharachorloo et al. |
| 2010/0013782 A1 | 1/2010 | Liu et al. |
| 2010/0020025 A1 | 1/2010 | Lemort et al. |
| 2010/0020091 A1 | 1/2010 | Rasmussen et al. |
| 2010/0023871 A1 | 1/2010 | Bederson et al. |
| 2010/0031186 A1 | 2/2010 | Tseng |
| 2010/0042911 A1 | 2/2010 | Wormald et al. |
| 2010/0050076 A1 | 2/2010 | Roth |
| 2010/0058248 A1 | 3/2010 | Park |
| 2010/0066698 A1 | 3/2010 | Seo |
| 2010/0070931 A1 | 3/2010 | Nichols |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079413 A1 | 4/2010 | Kawashima et al. |
| 2010/0081475 A1 | 4/2010 | Chiang et al. |
| 2010/0087169 A1 | 4/2010 | Lin |
| 2010/0087173 A1 | 4/2010 | Lin |
| 2010/0088634 A1 | 4/2010 | Tsuruta et al. |
| 2010/0088635 A1 | 4/2010 | Louch |
| 2010/0100839 A1 | 4/2010 | Tseng et al. |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0122110 A1 | 5/2010 | Ordogh |
| 2010/0138767 A1 | 6/2010 | Wang et al. |
| 2010/0145675 A1 | 6/2010 | Lloyd et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0216491 A1 | 8/2010 | Winkler et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0265196 A1 | 10/2010 | Lee et al. |
| 2010/0281402 A1 | 11/2010 | Staikos et al. |
| 2010/0281409 A1 | 11/2010 | Rainisto et al. |
| 2010/0283743 A1 | 11/2010 | Coddington et al. |
| 2010/0289806 A1 | 11/2010 | Lao et al. |
| 2010/0293056 A1 | 11/2010 | Flynt et al. |
| 2010/0295795 A1 | 11/2010 | Wilairat |
| 2010/0298034 A1 | 11/2010 | Shin et al. |
| 2010/0302172 A1 | 12/2010 | Wilairat |
| 2010/0302278 A1 | 12/2010 | Shaffer et al. |
| 2010/0302712 A1 | 12/2010 | Zednicek et al. |
| 2010/0311470 A1 | 12/2010 | Seo et al. |
| 2010/0313165 A1 | 12/2010 | Louch et al. |
| 2010/0321403 A1 | 12/2010 | Inadome |
| 2010/0328431 A1 | 12/2010 | Kim et al. |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0029598 A1 | 2/2011 | Arnold et al. |
| 2011/0029904 A1 | 2/2011 | Smith et al. |
| 2011/0029934 A1 | 2/2011 | Locker et al. |
| 2011/0043527 A1 | 2/2011 | Ording et al. |
| 2011/0055773 A1 | 3/2011 | Agarawala et al. |
| 2011/0074699 A1 | 3/2011 | Marr et al. |
| 2011/0074710 A1 | 3/2011 | Weeldreyer et al. |
| 2011/0074719 A1 | 3/2011 | Yeh et al. |
| 2011/0093778 A1 | 4/2011 | Kim et al. |
| 2011/0093816 A1 | 4/2011 | Chang et al. |
| 2011/0093821 A1 | 4/2011 | Wigdor et al. |
| 2011/0107272 A1 | 5/2011 | Aguilar |
| 2011/0113337 A1 | 5/2011 | Liu et al. |
| 2011/0113486 A1 | 5/2011 | Hunt et al. |
| 2011/0119586 A1 | 5/2011 | Blinnikka et al. |
| 2011/0154235 A1 | 6/2011 | Min et al. |
| 2011/0157027 A1 | 6/2011 | Rissa |
| 2011/0161845 A1 | 6/2011 | Stallings et al. |
| 2011/0163968 A1 | 7/2011 | Hogan |
| 2011/0173556 A1 | 7/2011 | Czerwinski et al. |
| 2011/0173568 A1 | 7/2011 | Royal, Jr. et al. |
| 2011/0175930 A1 | 7/2011 | Hwang et al. |
| 2011/0225547 A1 | 9/2011 | Fong et al. |
| 2011/0231796 A1 | 9/2011 | Vigil |
| 2011/0252380 A1 | 10/2011 | Chaudhri |
| 2012/0028687 A1 | 2/2012 | Wykes |
| 2012/0050185 A1 | 3/2012 | Davydov et al. |
| 2012/0050332 A1 | 3/2012 | Nikara et al. |
| 2012/0102433 A1 | 4/2012 | Falkenburg |
| 2012/0151397 A1 | 6/2012 | Oberstein et al. |
| 2012/0159395 A1 | 6/2012 | Deutsch et al. |
| 2012/0159402 A1 | 6/2012 | Nurmi et al. |
| 2012/0167008 A1 | 6/2012 | Zaman |
| 2012/0167011 A1 | 6/2012 | Zaman |
| 2012/0174005 A1 | 7/2012 | Deutsch et al. |
| 2012/0174029 A1 | 7/2012 | Bastide et al. |
| 2012/0179992 A1 | 7/2012 | Smuga |
| 2012/0210265 A1 | 8/2012 | Delia et al. |
| 2012/0212495 A1 | 8/2012 | Butcher |
| 2012/0216139 A1 | 8/2012 | Ording et al. |
| 2012/0233571 A1 | 9/2012 | Wever et al. |
| 2012/0244841 A1 | 9/2012 | Teng |
| 2012/0254780 A1 | 10/2012 | Mouton et al. |
| 2012/0265644 A1 | 10/2012 | Roa et al. |
| 2012/0290962 A1 | 11/2012 | Zielinski et al. |
| 2012/0299968 A1 | 11/2012 | Wong et al. |
| 2012/0304068 A1 | 11/2012 | Zaman et al. |
| 2012/0304092 A1 | 11/2012 | Jarrett et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0311485 A1 | 12/2012 | Caliendo, Jr. et al. |
| 2012/0323992 A1 | 12/2012 | Brobst et al. |
| 2013/0033525 A1 | 2/2013 | Markiewicz |
| 2013/0042203 A1 | 2/2013 | Wong et al. |
| 2013/0042206 A1 | 2/2013 | Zaman et al. |
| 2013/0044141 A1 | 2/2013 | Markiewicz |
| 2013/0047105 A1 | 2/2013 | Jarrett |

(56) References Cited

U.S. PATENT DOCUMENTS

| | | | |
|---|---|---|---|
| 2013/0047117 A1 | 2/2013 | Deutsch | |
| 2013/0057587 A1 | 3/2013 | Leonard et al. | |
| 2013/0057588 A1 | 3/2013 | Leonard | |
| 2013/0063442 A1 | 3/2013 | Zaman | |
| 2013/0063443 A1 | 3/2013 | Garside | |
| 2013/0063465 A1 | 3/2013 | Zaman | |
| 2013/0063490 A1 | 3/2013 | Zaman et al. | |
| 2013/0067381 A1 | 3/2013 | Yalovsky | |
| 2013/0067390 A1 | 3/2013 | Kwiatkowski | |
| 2013/0067391 A1 | 3/2013 | Pittappilly | |
| 2013/0067398 A1 | 3/2013 | Pittappilly | |
| 2013/0067399 A1 | 3/2013 | Elliott | |
| 2013/0067412 A1 | 3/2013 | Leonard et al. | |
| 2013/0067420 A1 | 3/2013 | Pittappilly | |
| 2013/0093757 A1 | 4/2013 | Cornell | |
| 2013/0102366 A1 | 4/2013 | Teng | |
| 2014/0068446 A1 | 3/2014 | Friedman | |
| 2014/0094226 A1 | 4/2014 | Friedman | |
| 2014/0109005 A1 | 4/2014 | Kruzeniski | |
| 2014/0320415 A1 | 10/2014 | Wykes et al. | |
| 2015/0040057 A1 | 2/2015 | Smuga et al. | |
| 2015/0378532 A1 | 12/2015 | Kruzeniski et al. | |

FOREIGN PATENT DOCUMENTS

| | | |
|---|---|---|
| CN | 1936797 | 3/2007 |
| CN | 101047656 | 10/2007 |
| CN | 101127736 | 2/2008 |
| CN | 101228570 | 7/2008 |
| CN | 101296457 | 10/2008 |
| CN | 101308440 | 11/2008 |
| CN | 101311891 | 11/2008 |
| CN | 102197702 | 9/2011 |
| EP | 0583060 | 2/1994 |
| EP | 1469375 | 10/2004 |
| EP | 1752868 | 2/2007 |
| EP | 1959338 | 8/2008 |
| JP | H03246614 | 11/1991 |
| JP | H06242886 | 9/1994 |
| JP | H0897887 | 4/1996 |
| JP | 2001125913 | 5/2001 |
| JP | 2002229906 | 8/2002 |
| JP | 2003076460 | 3/2003 |
| JP | 2004227393 | 8/2004 |
| JP | 2004357257 | 12/2004 |
| JP | 2005517240 | 6/2005 |
| JP | 2005242661 | 9/2005 |
| JP | 2005539432 | 12/2005 |
| JP | 2006139615 | 6/2006 |
| JP | 2006163647 | 6/2006 |
| JP | 2007141249 | 6/2007 |
| JP | 2007243275 | 9/2007 |
| JP | 2007527065 | 9/2007 |
| JP | 2007258893 | 10/2007 |
| JP | 2008148054 | 6/2008 |
| JP | 2008204210 | 9/2008 |
| JP | 2008217808 | 9/2008 |
| JP | 2008536196 | 9/2008 |
| JP | 2008257442 | 10/2008 |
| JP | 2009015157 | 1/2009 |
| JP | 2009521753 | 6/2009 |
| JP | 2009522666 | 6/2009 |
| JP | 2010218527 | 9/2010 |
| JP | 2012511209 | 5/2012 |
| KR | 200303655 | 2/2003 |
| KR | 20060019198 | 3/2006 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 20080084156 | 9/2008 |
| KR | 1020080084156 | 9/2008 |
| KR | 1020080113913 | 12/2008 |
| KR | 20090029307 | 3/2009 |
| KR | 1020090041635 | 4/2009 |
| KR | 20100010072 | 2/2010 |
| KR | 20100022509 | 3/2010 |
| KR | 20100048375 | 5/2010 |
| KR | 20100056369 | 5/2010 |
| KR | 1020100056369 | 5/2010 |
| RU | 2254611 | 1/2005 |
| RU | 2308076 | 10/2007 |
| RU | 2345425 | 1/2009 |
| RU | 2347261 | 2/2009 |
| TW | 200404444 | 3/2004 |
| TW | 200828096 | 7/2008 |
| TW | 201023026 | 6/2010 |
| WO | WO-9926127 | 5/1999 |
| WO | WO-03062976 | 7/2003 |
| WO | WO-03091034 | 11/2003 |
| WO | WO-2004097680 | 11/2004 |
| WO | WO-2005026931 | 3/2005 |
| WO | WO-2005027506 | 3/2005 |
| WO | WO-2006019639 | 2/2006 |
| WO | WO-2007030396 | 3/2007 |
| WO | WO-2007099424 | 9/2007 |
| WO | WO-2007121557 | 11/2007 |
| WO | WO-2007134623 | 11/2007 |
| WO | WO-2008030608 | 3/2008 |
| WO | WO-2008030976 | 3/2008 |
| WO | WO-2008031871 | 3/2008 |
| WO | WO-2008035831 | 3/2008 |
| WO | WO-2008104862 | 9/2008 |
| WO | WO-2008146784 | 12/2008 |
| WO | WO-2009000043 | 12/2008 |
| WO | WO-2009049331 | 4/2009 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010117661 | 10/2010 |
| WO | WO-2010135155 | 11/2010 |
| WO | WO-2011041885 | 4/2011 |

OTHER PUBLICATIONS

"Final Office Action", U.S. Appl. No. 13/776,533, Nov. 12, 2015, 56 pages.

"Adobe Acrobat 8 Standard User Guide", Adobe Systems Incorporated, 2007, pp. 34 & 36.

"Advisory Action", U.S. Appl. No. 12/414,382, Jan. 20, 2012, 3 pages.

"Advisory Action", U.S. Appl. No. 12/433,605, Apr. 5, 2012, 3 pages.

"Alltel Adds Dedicated Search Key to Phones", Retrieved from: <http://www.phonescoop.com/news/item.php?n=2159> on Nov. 26, 2008., Apr. 12, 2007, 2 Pages.

"Android 2.3 User's Guide", AUG-2.3-103, Android mobile technology platform 2.3, Dec. 13, 2010, 380 pages.

"Apple iPhone—8GB AT&T", Retrieved from: <http://nytimes.com.com/smartphones/apple-iphone-8gb-at/4515-6452_7-32309245.html> on Nov. 20, 2008, Jun. 29, 2007, 11 pages.

"Application User Model IDs", Retrieved from: <http://msdn.microsoft.com/en-us/library/dd378459(VS.85).aspx> on Sep. 28, 2010, 6 pages.

"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., Nov. 11, 2008, 3 pages.

"Basics of Your Device: Get Familiar with the Home Screen", Nokia USA—How to—retrieved from <http://www.nokia.ca/get-support-and-software/product-support/c6-01/how-to#> on May 11, 2011, 3 pages.

"Blackberry office tools: Qwerty Convert", Retrieved from: <http://blackberrysoftwarelist.net/blackberry/download-software/blackberry-office/qwerty_convert.aspx> on Nov. 20, 2008, 1 page.

"Calc4M", Retrieved from: <http://www.hellebo.com/Calc4M.html> on Dec. 11, 2008, Sep. 10, 2008, 4 Pages.

(56) References Cited

OTHER PUBLICATIONS

"Class ScrollView", Retrieved from: <http://www.blackberry.com/developers/docs/6.0.0api/net/rim/device/api/ui/ScrollView.html> on Sep. 28, 2010, 13 pages.

"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, 2009, 5 Pages.

"Corrected Notice of Allowance", U.S. Appl. No. 13/270,111, Jun. 17, 2014, 2 pages.

"Corrected Notice of Allowance", U.S. Appl. No. 13/270,111, Jun. 23, 2014, 3 pages.

"Corrected Notice of Allowance", U.S. Appl. No. 14/330,221, Feb. 2, 2015, 2 pages.

"Dial a number", Retrieved from: <http://www.phonespell.org/ialhelp.html> on Nov. 20, 2008, 1 page.

"DuoSense™ Multi-Touch Gestures", Retrieved from: <http://www.n-trig.com/Data/Uploads/Misc/DuoSenseMTG_final.pdf>, Jul. 2008, 4 pages.

"Elecont Quick Desktop 1.0.43", Retrieved from: <http://handheld.softpedia.com/get/System-Utilities/Launcher-Applications/Elecont-Quick-Desktop-72131.shtml> on May 5, 2009., Mar. 13, 2009, 2 pages.

"Email Notification for Microsoft Outlook and Outlook Express", Retrieved from: <http://www.contextmagic.com/express-notification/> on Sep. 29, 2010, Jul. 21, 2004, 3 pages.

"Enhanced IBM Power Systems Software and PowerVM Restructuring", IBM United States Announcement 208-082, dated Apr. 8, 2008, available at <http://www.ibm.com/common/ssi/rep_ca/2/897/ENUS208-082/ENUS208082.PDF>,Apr. 8, 2008, pp. 1-19.

"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, Aug. 1, 2008, 14 pages.

"Extended European Search Report", EP Application No. 09818253.8, Apr. 10, 2012, 7 pages.

"Extended European Search Report", EP Application No. 09822736.6, Dec. 18, 2012, 7 pages.

"Extended European Search Report", EP Application No. 10762112.0, Aug. 2, 2013, 7 Pages.

"Extended European Search Report", EP Application No. 10762120.3, Aug. 22, 2014, 9 pages.

"eXtreme Energy Conservation: Advanced Power-Saving Software for Wireless Devices", White Paper, Freescale Semiconductor, Inc., Document No. XTMENRGYCNSVWP, Rev #0, available at <http://www.freescale.com/files/32bit/doc/white_paper/XTMENRGYCNSVWP.pdf>, Feb. 2006, 15 pages.

"Final Office Action", U.S. Appl. No. 11/305,789, Apr. 1, 2009, 10 pages.

"Final Office Action", U.S. Appl. No. 11/502,264, Feb. 4, 2010, 15 pages.

"Final Office Action", U.S. Appl. No. 11/502,264, Mar. 29, 2013, 16 pages.

"Final Office Action", U.S. Appl. No. 11/502,264, Apr. 3, 2009, 9 pages.

"Final Office Action", U.S. Appl. No. 12/244,545, May 6, 2014, 24 pages.

"Final Office Action", U.S. Appl. No. 12/244,545, Dec. 7, 2011, 16 pages.

"Final Office Action", U.S. Appl. No. 12/244,545, Sep. 7, 2012, 23 pages.

"Final Office Action", U.S. Appl. No. 12/413,977, Nov. 17, 2011, 16 pages.

"Final Office Action", U.S. Appl. No. 12/414,382, Dec. 23, 2011, 7 pages.

"Final Office Action", U.S. Appl. No. 12/414,476, Apr. 8, 2013, 25 pages.

"Final Office Action", U.S. Appl. No. 12/414,476, Apr. 24, 2014, 19 pages.

"Final Office Action", U.S. Appl. No. 12/414,476, Dec. 1, 2011, 20 pages.

"Final Office Action", U.S. Appl. No. 12/433,605, Jul. 17, 2013, 13 pages.

"Final Office Action", U.S. Appl. No. 12/433,605, Feb. 3, 2012, 11 pages.

"Final Office Action", U.S. Appl. No. 12/433,667, Jan. 7, 2013, 17 pages.

"Final Office Action", U.S. Appl. No. 12/433,667, Sep. 13, 2011, 17 pages.

"Final Office Action", U.S. Appl. No. 12/469,458, Feb. 1, 2013, 19 pages.

"Final Office Action", U.S. Appl. No. 12/469,458, Oct. 11, 2013, 24 pages.

"Final Office Action", U.S. Appl. No. 12/469,458, Nov. 17, 2011, 15 pages.

"Final Office Action", U.S. Appl. No. 12/469,480, Apr. 10, 2013, 21 pages.

"Final Office Action", U.S. Appl. No. 12/469,480, Dec. 5, 2013, 24 pages.

"Final Office Action", U.S. Appl. No. 12/469,480, Feb. 9, 2012, 17 pages.

"Final Office Action", U.S. Appl. No. 12/480,969, Feb. 21, 2014, 21 pages.

"Final Office Action", U.S. Appl. No. 12/480,969, Nov. 23, 2012, 18 pages.

"Final Office Action", U.S. Appl. No. 12/480,969, Jul. 24, 2013, 19 pages.

"Final Office Action", U.S. Appl. No. 12/484,799, Apr. 30, 2012, 13 pages.

"Final Office Action", U.S. Appl. No. 12/560,081, Aug. 25, 2014, 27 pages.

"Final Office Action", U.S. Appl. No. 12/560,081, Mar. 14, 2012, 16 pages.

"Final Office Action", U.S. Appl. No. 13/418,884, Dec. 30, 2013, 8 pages.

"Final Office Action", U.S. Appl. No. 13/655,386, Jun. 6, 2013, 34 pages.

"Final Office Action", U.S. Appl. No. 13/656,354, Jun. 17, 2013, 14 pages.

"Final Office Action", U.S. Appl. No. 13/657,646, May 6, 2013, 12 pages.

"Final Office Action", U.S. Appl. No. 13/657,789, Jun. 21, 2013, 35 pages.

"Floating Layer", Retrieved from <http://web.archive.org/web/20011025040032/http://www.echoecho.com/toolfloatinglayer.htm> on Apr. 15, 2014, Oct. 25, 2001, 9 pages.

"Foreign Office Action", CN Application No. 200980142644.1, Aug. 20, 2013, 9 Pages.

"Foreign Office Action", CN Application No. 200980142661.5, Sep. 24, 2013, 8 Pages.

"Foreign Office Action", CN Application No. 201080015728.1, Oct. 29, 2013, 8 Pages.

"Foreign Office Action", CN Application No. 201080015802.X, Sep. 29, 2013, 11 Pages.

"Foreign Office Action", JP Application No. 2011-530109, Jul. 18, 2013, 4 Pages.

"Foreign Office Action", JP Application No. 2011-533353, Jul. 5, 2013, 9 Pages.

"Foreign Notice of Allowance", AU Application No. 2010234909, May 2, 2014, 3 pages.

"Foreign Notice of Allowance", CN Application No. 201080015802.X, Sep. 10, 2014, 6 Pages.

"Foreign Notice of Allowance", JP Application No. 2012-503523, Oct. 24, 2013, 4 pages.

"Foreign Notice of Allowance", JP Application No. 2012-511905, Sep. 24, 2014, 4 pages.

"Foreign Notice of Allowance", JP Application No. 2012-516218, Nov. 4, 2014, 4 Pages.

"Foreign Notice of Allowance", RU Application No. 2011147058, May 23, 2014, 13 pages.

"Foreign Office Action", AU Application No. 2010234909, Mar. 17, 2014, 4 Pages.

(56) References Cited

OTHER PUBLICATIONS

"Foreign Office Action", AU Application No. 2010260165, Mar. 25, 2014, 3 Pages.
"Foreign Office Action", AU Application No. 2010260165, May 1, 2014, 3 Pages.
"Foreign Office Action", CL Application No. 2379-2011, Jul. 3, 2013, 8 pages.
"Foreign Office Action", CN Application No. 200980139831.4, Mar. 24, 2014, 9 Pages.
"Foreign Office Action", CN Application No. 200980139831.4, Oct. 10, 2014, 10 Pages.
"Foreign Office Action", CN Application No. 200980139831.4, Jul. 1, 2013, 12 pages.
"Foreign Office Action", CN Application No. 200980142632.9, Jun. 14, 2013, 6 pages.
"Foreign Office Action", CN Application No. 200980142632.9, Jan. 29, 2013, 11 pages.
"Foreign Office Action", CN Application No. 200980142644.1, Mar. 5, 2014, 7 Pages.
"Foreign Office Action", CN Application No. 200980142644.1, Apr. 3, 2013, 10 pages.
"Foreign Office Action", CN Application No. 200980142661.5, Jan. 21, 2013, 12 pages.
"Foreign Office Action", CN Application No. 201080015728.1, May 16, 2013, 10 pages.
"Foreign Office Action", CN Application No. 201080015728.1, Dec. 26, 2012, 9 pages.
"Foreign Office Action", CN Application No. 201080015788.3, Jun. 5, 2013, 12 Pages.
"Foreign Office Action", CN Application No. 201080015788.3, Dec. 24, 2012, 10 pages.
"Foreign Office Action", CN Application No. 201080015802.X, May 19, 2014, 7 Pages.
"Foreign Office Action", CN Application No. 201080023212.1, Dec. 5, 2012, 10 pages.
"Foreign Office Action", CN Application No. 201080023212.1, Jun. 5, 2013, 8 pages.
"Foreign Office Action", CN Application No. 201080027409.2, Aug. 5, 2014, 12 Pages.
"Foreign Office Action", JP Application No. 2012-511905, Jan. 28, 2014, 6 Pages.
"Foreign Office Action", JP Application No. 2011-530109, May 2, 2014, 4 Pages.
"Foreign Office Action", JP Application No. 2011-533280, Nov. 26, 2013, 4 Pages.
"Foreign Office Action", JP Application No. 2011-533353, Nov. 26, 2013, 4 pages.
"Foreign Office Action", JP Application No. 2012-503514, Aug. 7, 2013, 5 pages.
"Foreign Office Action", JP Application No. 2012-503515, Nov. 18, 2013, 5 Pages.
"Foreign Office Action", JP Application No. 2012-503523, Apr. 22, 2013, 5 Pages.
"Foreign Office Action", JP Application No. 2012-516218, Mar. 6, 2014, 6 Pages.
"Foreign Office Action", MX Application No. MX/a/2011/012279, Jul. 4, 2013, 3 Pages.
"Foreign Office Action", RU Application No. 2011147058, Feb. 12, 2014, 7 Pages.
"Freeware.mobi", Retrieved from: <http://www.palmfreeware.mobi/download-palette.html> on Nov. 6, 2008, Oct. 9, 2001, 2 pages.
"GnomeCanvas", Retrieved from: <http://library.gnome.org/devel/libgnomecanvas/unstable/GnomeCanvas.html> on Sep. 28, 2010, 11 pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011, May 28, 2010, 1 page.
"How do I use Categories with my Weblog?", Retrieved from: <http://tpsupport.mtcs.sixapart.com/tp/us-tp1/how_do_i_use_categories_with_my_weblog.html> on Sep. 28, 2010, Sep. 16, 2009, 3 pages.
"How do you dial 1-800-Flowers", Retrieved from: <http://blogs.msdn.com/windowsmobile/archive/2007/02/06/how-do-you-dial-1-800-flowers.aspx> on Nov. 20, 2008, Feb. 6, 2007, 24 pages.
"HTC Shows HTC Snap with Snappy Email Feature", Retrieved from: <http://www.wirelessandmobilenews.com/smartphones/ on May 5, 2009>, May 4, 2009, 10 Pages.
"IntelliScreen-New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, May 13, 2008, 11 pages.
"Intent to Grant", EP Application No. 10762112.0, Aug. 28, 2014, 5 Pages.
"International Search Report and Written Opinion", Application No. PCT/US2010/028555, Oct. 12, 2010, 10 pages.
"International Search Report and Written Opinion", Application No. PCT/US2010/028699, Oct. 4, 2010, 10 pages.
"International Search Report and Written Opinion", Application No. PCT/US2011/067075, Dec. 12, 2012, 10 pages.
"International Search Report and Written Opinion", Application No. PCT/US2009/061864, May 14, 2010, 10 pages.
"International Search Report and Written Opinion", Application No. PCT/US2009/061382, May 26, 2010, 10 pages.
"International Search Report and Written Opinion", Application No. PCT/US2011/055725, Sep. 27, 2012, 10 pages.
"International Search Report and Written Opinion", Application No. PCT/US2009/061735, Jun. 7, 2010, 11 pages.
"International Search Report and Written Opinion", Application No. PCT/US2010/034772, Dec. 29, 2010, 12 pages.
"International Search Report and Written Opinion", Application No. PCT/US2012/047091, Dec. 27, 2012, 15 pages.
"International Search Report and Written Opinion", Application No. PCT/US2010/038730, Jan. 19, 2011, 8 pages.
"International Search Report and Written Opinion", Application No. PCT/US2011/055513, Mar. 27, 2012, 8 pages.
"International Search Report and Written Opinion", Application No. PCT/US2011/055514, May 22, 2012, 8 pages.
"International Search Report and Written Opinion", Application No. PCT/US2011/055512, May 24, 2012, 8 pages.
"International Search Report and Written Opinion", Application No. PCT/US2011/055520, May 9, 2012, 8 pages.
"International Search Report and Written Opinion", Application No. PCT/US2011/055524, Jun. 1, 2012, 8 pages.
"International Search Report and Written Opinion", Application No. PCT/US2011/065702, Aug. 29, 2012, 8 pages.
"International Search Report and Written Opinion", Application No. PCT/US2011/055736, Sep. 17, 2012, 8 pages.
"International Search Report and Written Opinion", Application No. PCT/US2011/067073, Sep. 17, 2012, 8 pages.
"International Search Report and Written Opinion", Application No. PCT/US2011/055511, Apr. 24, 2012, 9 pages.
"International Search Report and Written Opinion", Application No. PCT/US2011/055523, May 10, 2012, 9 pages.
"International Search Report and Written Opinion", Application No. PCT/US2011/055521, May 15, 2012, 9 pages.
"International Search Report and Written Opinion", Application No. PCT/US2011/055522, May 15, 2012, 9 pages.
"International Search Report and Written Opinion", Application No. PCT/US2011/055496, Sep. 12, 2012, 9 pages.
"International Search Report and Written Opinion", Application No. PCT/US2011/055712, Sep. 21, 2012, 9 pages.
"International Search Report and Written Opinion", Application No. PCT/US2011/055493, Sep. 26, 2012, 9 pages.
"International Search Report and Written Opinion", Application No. PCT/US2011/055478, Sep. 27, 2012, 9 pages.
"International Search Report and Written Opinion", Application No. PCT/US2011/055746, Sep. 27, 2012, 9 pages.

(56) References Cited

OTHER PUBLICATIONS

"International Search Report and Written Opinion", Application No. PCT/US2010/028553, Application Filing Date: Mar. 24, 2010,Nov. 9, 2010, 9 pages.

"Internet Explorer Window Restrictions", Retrieved from: http://technet.microsoft.com/en-us/library/cc759517(WS.10).aspx on Jun. 28, 2011, Microsoft TechNet, 5 pages.

"Introducing Application Styling for Windows Forms", Infragistics Software Manual, Version 7.3.20073.1043, Nov. 2007, 95 pages.

"Introduction to Windows Touch", Retrieved from: <http://download.microsoft.com/download/a/d/f/adf1347d-08dc-41a4-9084-623b1194d4b2/Win7_touch.docx>, Dec. 18, 2008, pp. 1-7.

"iPad User Guide", retrieved from <http://cyndidannerkuhn.info/CDK/iPads_Resources_files/iPad_User_Guide.pdf> on Jun. 17, 2011, 154 pages.

"iPod touch User Guide for iPhone OS 3.0 Software", Apple Inc., 2009, 153 pages.

"Keyboard (5)", Retrieved from: <http://landru.uwaterloo.ca/cgi-bin/man.cgi?section=5&topic=keyboard> on Dec. 11, 2008., Aug. 11, 1997, 8 Pages.

"Keyboard Shortcuts", Retrieved from: <http://www.pctoday.com/editorial/article.asp?article=articles%2F2005%2Ft0311%2F26t11%2F26t11.asp> on Aug. 3, 2009., Nov. 2005, 5 pages.

"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for the kiosk browser, Kiosk Project Kiosk Browser Chrome Customization Firefox-2.x,Aug. 16, 2007, 2 pages.

"Live Photo Gallery—Getting Started—from Camera to Panorama", Retrieved from: <http://webdotwiz.spaces.live.com/blog/cns!2782760752B93233!1729.entry> on May 5, 2009., Sep. 2008, 7 Pages.

"Magic mouse", Retrieved from: <http://www.apple.com/magicmouse/> on May 10, 2011, 3 pages.

"MIDTB Tip Sheet: Book Courier", Retrieved from: <http://www.midtb.org/tipsbookcourier.htm> on Dec. 11, 2008., Sep. 26, 2005, 6 Pages.

"Mobile/UI/Designs/TouchScreen/workingUI", Retrieved from: <https://wiki.mozilla.org/Mobile/UI/Designs/TouchScreen/workingUI> on Oct. 26, 2009, 2009, 30 pages.

"moGo beta v.0.4", Retrieved from: <http://forum.xda-developers.com/showthread.php?t=375196> on Sep. 27, 2010, Mar. 7, 2008, 10 pages.

"Multi-touch", Retrieved from <http://en.wikipedia.org/wiki/Multi-touch#Microsoft_Surface> on Apr. 24, 2009, Apr. 17, 2009, 8 pages.

"My Favorite Gadgets, System Monitor II", Retrieved from <http://www.myfavoritegadgets.info/monitors/SystemMonitorII/systemmonitorII.html> on Mar. 12, 2013, Jun. 8, 2010, 5 pages.

"New Features in WhatsUp Gold v12.0", retrieved from <http://www.netbright.co.th/?name=product&file=readproduct&id=12> on Jun. 10, 2011, 4 pages.

"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., Jan. 27, 2006, 2 Pages.

"Non-Final Office Action", U.S. Appl. No. 11/215,052, Jun. 23, 2011, 17 pages.

"Non-Final Office Action", U.S. Appl. No. 11/305,789, Sep. 21, 2009, 5 pages.

"Non-Final Office Action", U.S. Appl. No. 11/502,264, Sep. 30, 2009, 15 pages.

"Non-Final Office Action", U.S. Appl. No. 11/502,264, Sep. 14, 2012, 14 pages.

"Non-Final Office Action", U.S. Appl. No. 12/244,545, Dec. 19, 2013, 22 pages.

"Non-Final Office Action", U.S. Appl. No. 12/244,545, Mar. 27, 2012, 18 pages.

"Non-Final Office Action", U.S. Appl. No. 12/244,545, Aug. 17, 2011, 15 pages.

"Non-Final Office Action", U.S. Appl. No. 12/413,977, Jul. 19, 2011, 17 pages.

"Non-Final Office Action", U.S. Appl. No. 12/413,977, Jul. 20, 2012, 18 pages.

"Non-Final Office Action", U.S. Appl. No. 12/414,382, Jul. 26, 2011, 9 pages.

"Non-Final Office Action", U.S. Appl. No. 12/414,434, Jan. 17, 2012, 7 pages.

"Non-Final Office Action", U.S. Appl. No. 12/414,434, May 31, 2012, 7 pages.

"Non-Final Office Action", U.S. Appl. No. 12/414,434, Aug. 2, 2011, 6 pages.

"Non-Final Office Action", U.S. Appl. No. 12/414,455, Aug. 29, 2011, 8 pages.

"Non-Final Office Action", U.S. Appl. No. 12/414,458, Jul. 6, 2011, 8 pages.

"Non-Final Office Action", U.S. Appl. No. 12/414,476, Oct. 25, 2013, 18 pages.

"Non-Final Office Action", U.S. Appl. No. 12/414,476, Nov. 9, 2012, 22 pages.

"Non-Final Office Action", U.S. Appl. No. 12/414,476, Aug. 3, 2011, 21 pages.

"Non-Final Office Action", U.S. Appl. No. 12/433,605, Jan. 11, 2013, 7 pages.

"Non-Final Office Action", U.S. Appl. No. 12/433,605, Nov. 6, 2013, 16 pages.

"Non-Final Office Action", U.S. Appl. No. 12/433,605, Jun. 24, 2011, 10 pages.

"Non-Final Office Action", U.S. Appl. No. 12/433,667, Jun. 7, 2011, 15 pages.

"Non-Final Office Action", U.S. Appl. No. 12/433,667, Feb. 3, 2012, 16 pages.

"Non-Final Office Action", U.S. Appl. No. 12/469,419, Nov. 9, 2011, 15 pages.

"Non-Final Office Action", U.S. Appl. No. 12/469,419, May 23, 2012, 13 pages.

"Non-Final Office Action", U.S. Appl. No. 12/469,458, May 3, 2013, 21 pages.

"Non-Final Office Action", U.S. Appl. No. 12/469,458, Jul. 1, 2011, 15 pages.

"Non-Final Office Action", U.S. Appl. No. 12/469,458, Sep. 21, 2012, 14 pages.

"Non-Final Office Action", U.S. Appl. No. 12/469,480, Aug. 27, 2013, 22 pages.

"Non-Final Office Action", U.S. Appl. No. 12/469,480, Oct. 17, 2012, 16 pages.

"Non-Final Office Action", U.S. Appl. No. 12/469,480, Sep. 22, 2011, 14 pages.

"Non-Final Office Action", U.S. Appl. No. 12/470,558, Nov. 22, 2011, 9 pages.

"Non-Final Office Action", U.S. Appl. No. 12/480,969, Apr. 4, 2013, 22 pages.

"Non-Final Office Action", U.S. Appl. No. 12/480,969, Oct. 29, 2013, 22 pages.

"Non-Final Office Action", U.S. Appl. No. 12/480,969, Aug. 7, 2012, 15 pages.

"Non-Final Office Action", U.S. Appl. No. 12/484,799, Aug. 11, 2011, 12 pages.

"Non-Final Office Action", U.S. Appl. No. 12/484,799, Aug. 7, 2012, 13 pages.

"Non-Final Office Action", U.S. Appl. No. 12/484,845, Dec. 7, 2011, 16 pages.

"Non-Final Office Action", U.S. Appl. No. 12/560,081, Apr. 30, 2014, 25 pages.

"Non-Final Office Action", U.S. Appl. No. 12/560,081, Dec. 7, 2011, 16 pages.

"Non-Final Office Action", U.S. Appl. No. 12/972,967, Jan. 30, 2013, 19 pages.

"Non-Final Office Action", U.S. Appl. No. 12/977,584, Dec. 7, 2012, 8 pages.

(56) References Cited

OTHER PUBLICATIONS

"Non-Final Office Action", U.S. Appl. No. 12/978,184, Jan. 23, 2013, 7 pages.
"Non-Final Office Action", U.S. Appl. No. 12/983,106, Nov. 9, 2012, 17 pages.
"Non-Final Office Action", U.S. Appl. No. 13/073,300, Jul. 25, 2013, 13 pages.
"Non-Final Office Action", U.S. Appl. No. 13/118,204, Feb. 28, 2013, 13 pages.
"Non-Final Office Action", U.S. Appl. No. 13/118,257, Mar. 5, 2013, 19 pages.
"Non-Final Office Action", U.S. Appl. No. 13/118,321, Jun. 10, 2013, 32 pages.
"Non-Final Office Action", U.S. Appl. No. 13/118,333, Jul. 5, 2013, 18 pages.
"Non-Final Office Action", U.S. Appl. No. 13/118,339, Feb. 11, 2013, 15 pages.
"Non-Final Office Action", U.S. Appl. No. 13/118,347, Feb. 12, 2013, 14 pages.
"Non-Final Office Action", U.S. Appl. No. 13/196,272, Feb. 6, 2013, 10 pages.
"Non-Final Office Action", U.S. Appl. No. 13/224,258, Jan. 8, 2013, 35 pages.
"Non-Final Office Action", U.S. Appl. No. 13/229,693, Mar. 12, 2013, 21 pages.
"Non-Final Office Action", U.S. Appl. No. 13/270,111, Oct. 21, 2013, 9 pages.
"Non-Final Office Action", U.S. Appl. No. 13/418,884, Sep. 30, 2013, 7 pages.
"Non-Final Office Action", U.S. Appl. No. 13/418,884, Mar. 10, 2014, 8 pages.
"Non-Final Office Action", U.S. Appl. No. 13/418,884, Jun. 16, 2014, 8 pages.
"Non-Final Office Action", U.S. Appl. No. 13/461,656, Aug. 8, 2014, 27 pages.
"Non-Final Office Action", U.S. Appl. No. 13/492,495, Dec. 19, 2012, 6 pages.
"Non-Final Office Action", U.S. Appl. No. 13/492,495, Sep. 17, 2012, 8 pages.
"Non-Final Office Action", U.S. Appl. No. 13/655,386, Dec. 26, 2012, 23 pages.
"Non-Final Office Action", U.S. Appl. No. 13/656,354, Feb. 6, 2013, 10 pages.
"Non-Final Office Action", U.S. Appl. No. 13/656,574, Jan. 31, 2013, 21 pages.
"Non-Final Office Action", U.S. Appl. No. 13/657,621, Feb. 7, 2013, 19 pages.
"Non-Final Office Action", U.S. Appl. No. 13/657,646, Jan. 3, 2013, 13 pages.
"Non-Final Office Action", U.S. Appl. No. 13/657,789, Jan. 9, 2013, 38 pages.
"Non-Final Office Action", U.S. Appl. No. 13/712,777, Mar. 20, 2014, 7 pages.
"Notice of Acceptance", AU Application No. 2010260165, Jun. 23, 2014, 3 Pages.
"Notice of Allowance", U.S. Appl. No. 11/215,052, Mar. 14, 2012, 5 pages.
"Notice of Allowance", U.S. Appl. No. 11/305,789, Nov. 23, 2009, 8 pages.
"Notice of Allowance", U.S. Appl. No. 12/414,382, Apr. 4, 2012, 4 pages.
"Notice of Allowance", U.S. Appl. No. 12/414,434, Aug. 17, 2012, 4 pages.
"Notice of Allowance", U.S. Appl. No. 12/414,455, Jan. 4, 2012, 4 pages.
"Notice of Allowance", U.S. Appl. No. 12/414,458, Oct. 31, 2011, 2 pages.
"Notice of Allowance", U.S. Appl. No. 12/414,458, Nov. 29, 2011, 2 pages.
"Notice of Allowance", U.S. Appl. No. 12/414,458, Aug. 10, 2011, 6 pages.
"Notice of Allowance", U.S. Appl. No. 12/433,605, Apr. 25, 2014, 4 pages.
"Notice of Allowance", U.S. Appl. No. 12/433,667, Jun. 25, 2013, 14 pages.
"Notice of Allowance", U.S. Appl. No. 12/469,419, Nov. 27, 2012, 13 pages.
"Notice of Allowance", U.S. Appl. No. 12/470,558, Apr. 2, 2012, 7 pages.
"Notice of Allowance", U.S. Appl. No. 12/470,558, Aug. 23, 2012, 2 pages.
"Notice of Allowance", U.S. Appl. No. 12/484,799, Oct. 22, 2012, 10 pages.
"Notice of Allowance", U.S. Appl. No. 12/484,845, Mar. 16, 2012, 5 pages.
"Notice of Allowance", U.S. Appl. No. 12/977,584, Jun. 19, 2013, 5 pages.
"Notice of Allowance", U.S. Appl. No. 12/978,184, Aug. 2, 2013, 5 pages.
"Notice of Allowance", U.S. Appl. No. 13/270,111, Mar. 7, 2014, 6 pages.
"Notice of Allowance", U.S. Appl. No. 13/418,884, Aug. 5, 2014, 4 pages.
"Notice of Allowance", U.S. Appl. No. 13/492,495, Apr. 26, 2013, 5 pages.
"Notice of Allowance", U.S. Appl. No. 13/655,390, May 24, 2013, 5 pages.
"Notice of Allowance", U.S. Appl. No. 13/712,777, Jul. 2, 2014, 4 pages.
"Notice of Allowance", U.S. Appl. No. 14/330,221, Oct. 16, 2014, 7 pages.
"Notifications", retrieved from <http://msdn.microsoft.com/en-us/library/aa511497.aspx> on May 10, 2011, 16 pages.
"OmneMon™ System Resource Metrics", retrieved from <http://www.omnesys.com/documents/OmneMonSRM_Brochure.pdf> on Jun. 10, 2011, 3 pages.
"ONYX Graphics Announces New ONYX Prepedge Job Preparation Software", retrieved from <http://www.largeformatreview.com/rip-software/433-onyx-graphics-announces-new-onyx-> on May 10, 2011, 2 pages.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., Dec. 1999, 8 pages.
"Oracle8i Application Developer's Guide—Advanced Queuing", Retrieved from: http://www.cs.umbc.edu/help/oracle8/server.815/a68005/03_adq1i.htm on May 6, 2009., Feb. 1999, 29 Pages.
"Oracle8i Concepts Release 8.1.5", Retrieved from: http://www.cs.umbc.edu/help/oracle8/server.815/a67781/c16queue.htm on May 6, 2009., Feb. 1999, 10 Pages.
"Palette Extender 1.0.2", Retrieved from: <http://palette-extender.en.softonic.com/symbian> on Nov. 6, 2008, Jan. 21, 2003, 2 pages.
"Parallax Scrolling", Retrieved from: <http://en.wikipedia.org/wiki/Parallax_scrolling> on May 5, 2009., May 4, 2009, 3 Pages.
"Push Notifications Overview for Windows Phone", Retrieved from: <http://msdn.microsoft.com/en-us/library/ff402558%28VS.92%29.aspx> on Sep. 30, 2010, Sep. 3, 2010, 1 page.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., Jul. 15, 2005, 5 Pages.
"SecureMe-Anti-Theft Security Application for S60 3rd", Retrieved from: <http://www.killermobile.com/newsite/mobile-software/s60-applications/secureme-%11-anti%11theft-security-application-for-s60-3rd.htm> on Jun. 28, 2011, Dec. 15, 2008, 3 pages.
"Snap", Windows 7 Features—retrieved from <http://windows.microsoft.com/en-US/windows7/products/features/snap> on Sep. 23, 2011, 2 pages.
"Supplemental Notice of Allowance", U.S. Appl. No. 12/433,667, Oct. 10, 2013, 2 pages.
"Supplemental Notice of Allowance", U.S. Appl. No. 12/433,667, Aug. 1, 2013, 2 pages.

(56) References Cited

OTHER PUBLICATIONS

"Supplemental Notice of Allowance", U.S. Appl. No. 13/655,390, Jul. 25, 2013, 2 pages.
"Symbian Applications", Retrieved from: <http://symbianfullversion.blogspot.com/2008_12_01_archive.html> on May 5, 2009., Jan. 2009, 51 Pages.
"The Map Screen", retrieved from <http://www.symbianos.org/whereamiusersguide> on Jun. 17, 2011, 3 pages.
"Top 3 Task Switchers for Android", TechCredo—retrieved from <http://www.techcredo.com/android/top-3-task-switchers-for-android> on May 11, 2011, Mar. 9, 2011, 5 pages.
"Top Android App: Swipepad", Best Android Apps Review—retrieved from <http://www.bestandroidappsreview.com/2011/01/top-android-app-swipepad-launcher.html> on May 11, 2011, 4 pages.
"Touch Shell Free", Retrieved from: <http://www.pocketpcfreeware.mobi/download-touch-shell-free.html> on May 5, 2009., Feb. 23, 2009, 2 Pages.
"User Guide", retrieved from <http://wireframesketcher.com/help/help.html> on Jun. 17, 2011, 19 pages.
"Windows 8 Is Gorgeous, But Is It More Than Just a Shell? (Video)", retrieved from <http://techcrunch.com/2011/06/02/windows-8-gorgeous-shell-video/> on Jun. 20, 2011, Jun. 2, 2011, 6 pages.
"Windows Phone 7 (Push Notification)", retrieved from <http://unknownerror.net/2011-06/windows-phone-7-push-notification-36520> on Jul. 6, 2011, 4 pages.
"Windows Phone 7 Live Tiles", Retrieved from: <http://www.knowyourmobile.com/microsoft/windowsphone7/startscreen/640737/windows_phone_7_live_tiles.html> on May 11, 2011, Oct. 20, 2010, 3 pages.
"Winterface Review", Retrieved from: <http://www.mytodayscreen.com/winterface-review/> on Nov. 12, 2008, Jul. 9, 2008, 42 pages.
"Womma", Retrieved from: <http://www.womma.org/blog/links/wom-trends/> on May 5, 2009., 2007, 70 Pages.
"Working with Multiple Windows", MSOFFICE tutorial!—retrieved from <http://www.msoffice-tutorial.com/working-with-multiple-windows.php> on Sep. 23, 2011, 3 pages.
"YUI 3: ScrollView [beta]", Retrieved from: <http://developer.yahoo.com/yui/3/scrollview/> on Sep. 28, 2010, 5 pages.
Bates, "A Framework to Support Large-Scale Active Applications", University of Cambridge Computer Laboratory—Available at <http://citeseerx.ist.psu.edu/viewdoc/download?doi=10.1.1.48.1690&rep=rep1&type=pdf>, 1996, 8 pages.
Beiber, et al.,' "Screen Coverage: A Pen-Interaction Problem for FDA's and Touch Screen Computers", In Proceedings of ICWMC 2007, Mar. 2007, 6 pages.
Bjork, et al.,' "Redefining the Focus and Context of Focus+Context Visualizations", In Proceedings of INFOVIS 2000—Available at <http://www.johan.redstrom.se/papers/redefining.pdf>, Oct. 2000, 9 Pages.
Bowes, et al.,' "Transparency for Item Highlighting", Faculty of Computing Science, Dalhousie University—Available at <http://torch.cs.dal.ca/~dearman/pubs/GI2003-bowes,dearman,perkins-paper.pdf>, 2003, 2 pages.
Bruzzese, "Using Windows 7, Managing and Monitoring Windows 7—Chapter 11", Que Publishing, May 5, 2010, 33 pages.
Buring, "User Interaction with Scatterplots on Small Screens—A Comparative Evaluation of Geometric-Semantic Zoom and Fisheye Distortion", IEEE Transactions on Visualization and Computer Graphics, vol. 12, Issue 5, Available at <http://citeseerx.ist.psu.edu/viewdoc/download?doi=10.1.1.134.4568&rep=rep1&type=pdf>,Sep. 2006, pp. 829-836.
Carrera, et al.,' "Conserving Disk Energy in Network Servers", available at <http://citeseerx.ist.psu.edu/viewdoc/download-?doi=10.1.1.6.8301&rep=rep1&type=ps>, Nov. 2002, 15 pages.
Cawley, "How to Customize Your Windows Phone 7", Retrieved from: <http://www.brighthub.com/mobile/windows-mobile-platform/articles/95213.aspx> on May 10, 2011, Nov. 12, 2010, 3 pages.
Cawley, "Windows Phone 7 Customization Tips and Tricks", retrieved from <http://www.brighthub.com/mobile/windows-mobile-platform/articles/95213.aspx> on Jun. 20, 2011, May 16, 2011, 2 pages.
Cohen, et al.,' "Wang Tiles for Image and Texture Generation", In Proceedings of SIGGRAPH 2003—Available <http://research.microsoft.com/en-us/um/people/cohen/WangFinal.pdf>, 2003, 8 pages.
Crouch, "Smartphone Wars: Micron's Slide-to-Unlock Patent", Jan. 30, 2013, 2 pages.
Damien, "7 Ways to Supercharge Multitasking in Android", retrieved from <http://maketecheasier.com/7-ways-to-supercharge-multitasking-in-android/2011/01/22/> on May 11, 2011, Jan. 22, 2011, 5 pages.
Davis, "A WPF Custom Control for Zooming and Panning", Retrieved from: <http://www.codeproject.com/KB/WPF/zoomandpancontrol.aspx> on Sep. 28, 2010, Jun. 29, 2010, 21 pages.
Delimarsky, "Sending Tile Push Notifications on Windows Phone 7", retrieved from <http://mobile.dzone.com/articles/sending-tile-push> on May 10, 2011, Aug. 25, 2010, 2 pages.
Denoue, et al.,' "WebNC: Efficient Sharing of Web Applications", In Proceedings of WWW 2009—Available at <http://www.fxpal.com/publications/FXPAL-PR-09-495.pdf>, 2009, 2 pages.
Dolcourt, "Webware", Retrieved from: <http://news.cnet.com/webware/?categoryId=2010> on May 5, 2009, 13 Pages.
Dunsmuir, "Selective Semantic Zoom of a Document Collection", Available at <http://www.cs.ubc.ca/~tmm/courses/533/projects/dustin/proposal.pdf>, Oct. 30, 2009, pp. 1-9.
Faaborg, "The Design Review Episode 2: Chromeless Browsing", Available at: http://vimeo.com/2836740, Jan. 15, 2009, 3 pages.
Fisher, "Cool Discussion of Push Notifications—Toast and Tile—on Windows Phone", Retrieved from: <http://www.windowsphoneexpert.com/Connection/forums/p/4153/18399.aspx> on Sep. 29, 2010, May 3, 2010, 3 pages.
Gade, "Samsung Alias u740", Retrieved from: <http://www.mobiletechreview.com/phones/Samsung-U740.htm> on Nov. 20, 2008, Mar. 14, 2007, 6 pages.
Gao, "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, Feb. 2007, pp. 1-42.
Gralla, "Windows XP Hacks, Chapter 13—Hardware Hacks", O'Reilly Publishing, Feb. 23, 2005, 25 pages.
Ha, et al.,' "Simkeys: An Efficient Keypad Configuration for Mobile Communications", Retrieved from: < http://ieeexplore.ieee.org/stamp/stamp.jsp?arnumber=01362557.> on Dec. 17, 2008, Nov. 2004, 7 Pages.
Harrison, "Symbian OS C++ for Mobile Phones vol. 3", Retrieved from: <http://www.amazon.co.uk/Symbian-OS-Mobile-Phones-Press/dp/productdescription/0470066415> on Oct. 23, 2008, Symbian Press,Jun. 16, 2003, 4 pages.
Hickey, "Google Android has Landed; T-Mobile, HTC Unveil G1", Retrieved from: <http://www.crn.com/retail/210603348> on Nov. 26, 2008., Sep. 23, 2008, 4 pages.
Horowitz, "Installing and Tweaking Process Explorer part 2", Retrieved from <http://web.archive.org/web/20110510093838/http://blogs.computerworld.com/16165/installing_and_tweaking_process_explorer_part_2> on Mar. 12, 2013, May 23, 2010, 7 pages.
Janecek, et al.,' "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf>, Feb. 15, 2005, pp. 1-15.
Kcholi, "Windows CE .Net Interprocess Communication", Retrieved from http://msdn.microsoft.com/en-us/library/ms836784.aspx on Jul. 17, 2008., Jan. 2004, 15 Pages.
Kurdi, "Acer GridVista: snap your windows to pre-defined sections on your screen(s)", Retrieved from <http://www.freewaregenius.

(56) References Cited

OTHER PUBLICATIONS com/acer-gridvista-snap-your-windows-to-pre-defined-sections-of-your-screens/> on Jun. 30, 2013, Jan. 19, 2010, 6 pages.
Kurdi, "WinSplit Revolution", Retrieved from <http://www.freewaregenius.com/winsplit-revolution/> on Jun. 30, 2013, Aug. 22, 2007, 4 Pages.
La, "Parallax Gallery", Available at <http://webdesignerwall.comtutorials/parallax-gallery/comment-page-1>, Apr. 25, 2008, 16 pages.
Livingston, et al.,' "Windows 95 Secrets", 1995, I DG Books Worldwide, 3rd Edition, 1995, pp. 121-127.
Long, "Gmail Manager 0.6", Retrieved from: <https://addons.mozilla.org/en-US/firefox/addon/1320/> on Sep. 29, 2010, Jan. 27, 2010, 4 pages.
Mann, et al.,' "Spectrum Analysis of Motion Parallax in a 3D Cluttered Scene and Application to Egomotion", Journal of the Optical Society of America A, vol. 22, No. 9—Available at <http://www.cs.uwaterloo.ca/~mannr/snow/josa-mann-langer.pdf>, Sep. 2005, pp. 1717-1731.
Mantia, "Multitasking: What Does It Mean?", retrieved from <http://mantia.me/blog/multitasking/> on Sep. 23, 2011, 3 pages.
Mao, "Comments of Verizon Wireless Messaging Services, LLC", Retrieved from: http://www.ntia.doc.gov/osmhome/warnings/comments/verizon.htm on May 6, 2009., Aug. 18, 2000, 5 Pages.
Marie, "MacBook Trackpad Four Fingers Swipe Left/Right to Switch Applications", MacBook Junkie—retrieved from <http://www.macbookjunkie.com/macbook-trackpad-four-fingers-swipe-left-right-to-switch-applications/> on May 11, 2011, Nov. 13, 2010, 4 pages.
Mei, et al.,' "Probabilistic Multimodality Fusion for Event Based Home Photo Clustering", Retrieved from: <http://ieeexplore.ieee.org//stamp/stamp.jsp?tp=&arnumber=04036960.>, Dec. 26, 2006, pp. 1757-1760.
Nordgren, "Development of a Touch Screen Interface for Scania Interactor", Master's Thesis in C—Available at <http://www.cs.umu.se/education/examina/Rapporter/PederNordgren.pdf>omputing Science, UMEA University, Apr. 10, 2007, pp. 1-59.
Oliver, "Potential iPhone Usability and Interface Improvements", Retrieved from: <http://www.appleinsider.com/articles/08/09/18/potential_iphone_usability_and_interface_improvements.html> on Nov. 12, 2008, AppleInsider,Sep. 18, 2008, 4 pages.
Oryl, "Review: Asus P527 Smartphone for North America", Retrieved from: <http://www.mobileburn.com/review.jsp?Id=4257> on Dec. 17, 2008., Mar. 5, 2008, 1 Page.
Padilla, "Palm Treo 750 Cell Phone Review—Hardware", Retrieved from: <http://www.wirelessinfo.com/content/palm-Treo-750-Cell-Phone-Review/Hardware.htm> on Dec. 11, 2008., Mar. 17, 2007, 4 Pages.
Paul, "Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, Aug. 2010, 3 pages.
Perry, "Teach Yourself Windows 95 in 24 Hours", 1997, Sams Publishing, 2nd Edition, 1997, pp. 193-198.
Raghaven, et al.,' "Model Based Estimation and Verification of Mobile Device Performance", Available at http://alumni.cs.ucsb.edu/~raimisl/emsoft04_12.pdf., Sep. 27-29, 2004, 10 Pages.
Ray, "Microsoft Re-Tiles Mobile Platform for Windows 7 Era", retrieved from <http://www.theregister.co.uk/2010/02/15/windows_phone_7_series/> on May 11, 2011, Feb. 15, 2010, 2 pages.
Reed, "Microsoft Demos Windows Mobile 6.1 at CTIA", Retrieved from: <http://www.networkworld.com/news/2008/040208-ctia-microsoft-windows-mobile.html> on Jul. 18, 2008, Apr. 2, 2008, 1 page.
Remond, "Mobile Marketing Solutions", Retrieved from: <http://www.mobilemarketingmagazine.co.uk/mobile_social_networking/> on May 5, 2009., Apr. 28, 2009, 16 Pages.
Rice, et al.,' "A System for Searching Sound Palettes", Proceedings of the Eleventh Biennial Symposium on Arts and Technology Available at <http://www.comparisonics.com/FindSoundsPalettePaper.pdf>,Feb. 2008, 6 pages.
Ritchie, "iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, Jun. 14, 2010, 2 pages.
Ritscher, "Using Surface APIs in your WPF application—Part 1", Retrieved from: <http://blog.wpfwonderland.com/2009/06/30/using-surface-apis-in-your-wpf-application/> on Sep. 28, 2010, Jun. 30, 2009, 7 pages.
Roberts, "Touching and Gesturing on the iPhone", Available at <http://www.sitepen.com/blog/2008/07/10/touching-and-gesturing-on-the-iphone/comments-pare-1>, Jul. 10, 2008, 16 pages.
Sandoval, "A development platform and execution environment for mobile applications", Universidad Autónoma de Baja California, School of Chemical Sciences and Engineering, Available at <http://citeseerx.ist.psu.edu/viewdoc/download?doi=10.1.1.86.7989&rep=rep1&type=pdf>,2004, 18 pages.
Singh, et al.,' "CINEMA: Columbia InterNet Extensible Multimedia Architecture", Available at <http://www1.cs.columbia.edu/~library/TR-repository/reports/reports-2002/cucs-011-02.pdf>, Sep. 3, 2002, 83 Pages.
Smith, et al.,' "GroupBar: The TaskBar Evolved", Proceedings of OZCHI 2003—Available at <http://research.microsoft.com/pubs/64316/ozchi2003-groupbar.pdf>, Nov. 2003, pp. 1-10.
Steinicke, et al.,' "Multi-Touching 3D Data: Towards Direct Interaction in Stereoscopic Display Environments coupled with Mobile Devices", Advanced Visual Interfaces (AVI) Workshop on Designing Multi-Touch Interaction Techniques for Coupled Public, Available at <http://viscg.uni-muenster.de/publications/2008/SHSK08/ppd-workshop.-pdf.>,Jun. 15, 2008, 4 Pages.
Suror, "PocketShield—New Screenlock App for the HTC Diamond and Pro", Retrieved from: <http://wmpoweruser.com/?tag=htc-touch-diamond> on Jun. 28, 2011, Oct. 23, 2008, 2 pages.
Terpstra, "Beta Beat: Grape, a New Way to Manage Your Desktop Clutter", Retrieved from: http://www.tuaw.com/2009/04/14/beta-beat-grape-a-new-way-to-manage-your-desktop-clutter/, Apr. 14, 2009, 4 pages.
Vallerio, et al.,' "Energy-Efficient Graphical User Interface Design", Retrieved from: <http://www.cc.gatech.edu/classes/AY2007/cs7470_fall/zhong-energy-efficient-user-interface.pdf>, Jun. 10, 2004, pp. 1-13.
Vermeulen, "BlackBerry PlayBook Hands-on", retrieved from <http://mybroadband.co.za/news/gadgets/20104-BlackBerry-PlayBook-hands-.html> on May 11, 2011, May 8, 2011, 4 pages.
Viticci, "Growl 1.3 to Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011, Jul. 6, 2011, 6 pages.
Vornberger, "Bluetile", Retrieved from: <http://www.bluetile.org> on Sep. 29, 2010, 5 pages.
Wilson, "How the iPhone Works", Retrieved from: <http://electronics.howstuffworks.com/iphone2.htm> on Apr. 24, 2009, Jan. 2007, 9 pages.
Wilson, "Robust Computer Vision-Based Detection of Pinching for One and Two-Handed Gesture Input", In Proceedings of UIST 2006—Available at <http://research.microsoft.com/en-us/um/people/awilson/publications/wilsonuist2006/uist%202006%20taffi.pdf>, Oct. 2006, 4 pages.
Wobbrock, et al.,' "User-Defined Gestures for Surface Computing", CHI 2009, Apr. 4-9, 2009, Boston, MA—available at <http://faculty.washington.edu/wobbrock/pubs/chi-09.2.pdf>, Apr. 4, 2009, 10 pages.
Wu, et al.,' "Achieving a Superior Ownership Experience in Manageability and Quality for Siebel CRM", available at <http://www.oracle.com/us/products/enterprise-manager/superior-exp-for-siebel-crm-068962.pdf>, Aug. 2008, 25 pages.
Wyatt, "/Flash/the art of parallax scrolling", .net Magazine, Aug. 1, 2007, pp. 74-76.

(56) References Cited

OTHER PUBLICATIONS

Yang, et al.,' "Semantic Photo Album Based on MPEG-4 Compatible Application Format", Retrieved from: <http://ieeexplore.ieee.org/stamp/stamp.jsp?arnumber=04146254.>, 2007, 2 Pages.
"Extended European Search Report", EP Application No. 10778152.8, Apr. 14, 2015, 7 pages.
"Final Office Action", U.S. Appl. No. 13/461,656, May 7, 2015, 24 pages.
"Foreign Notice of Allowance", RU Application No. 2011151097, Feb. 26, 2015, 16 pages.
"Foreign Office Action", CN Application No. 201080027409.2, Apr. 20, 2015, 14 Pages.
"Foreign Office Action", IL Application No. 214804, Mar. 12, 2015, 6 Pages.
"Non-Final Office Action", U.S. Appl. No. 13/776,533, May 19, 2015, 52 pages.
"Supplementary European Search Report", EP Application No. 10790080.5, Apr. 21, 2015, 3 pages.
"Foreign Office Action", IL Application No. 215757, May 18, 2015, 6 Pages.
"Foreign Office Action", TW Application No. 98135986, Jun. 10, 2015, 13 Pages.
"Non-Final Office Action", U.S. Appl. No. 13/835,603, Jun. 26, 2015, 8 pages.
"Notice of Allowance", U.S. Appl. No. 12/560,081, Aug. 10, 2015, 15 pages.
"Notice of Allowance", U.S. Appl. No. 13/835,603, Dec. 18, 2015, 5 pages.
"Foreign Office Action", KR Application No. 10-2011-7022964, Jan. 15, 2016, 8 pages.
"Foreign Notice of Allowance", JP Application No. 2012-503514, Jan. 15, 2014, 4 pages.
"Foreign Notice of Allowance", KR Application No. 10-2011-7022963, Apr. 27, 2016, 6 pages.
"Foreign Office Action", EP Application No. 10790080.5, Jun. 10, 2016, 6 pages.
"Foreign Office Action", IL Application No. 214804, Jun. 20, 2016, 2 pages.
"Foreign Office Action", JP Application No. 2012-503514, Apr. 9, 2013, 4 pages.
"Foreign Office Action", KR Application No. 10-2011-7022963, Dec. 28, 2015, 6 pages.
"Motorola MPx—Full phone specifications", Retrieved at: http://www.gsmarena.com/motorola_mpx-673.php—on Jul. 26, 2016, 2 pages.
"Motorola MPx pictures, official photos", Retrieved at: http://www.gsmarena.com/motorola_mpx-pictures-673.php—on Jul. 26, 2016, 1 page.
"Non-Final Office Action", U.S. Appl. No. 13/776,533, Jun. 1, 2016, 57 pages.
"Non-Final Office Action", U.S. Appl. No. 14/517,457, Sep. 15, 2016, 6 pages.
"Foreign Office Action", TW Application No. 104132892, Oct. 20, 2016, 7 pages.

\* cited by examiner

ALTERNATIVE INPUTS OF A MOBILE COMMUNICATIONS DEVICE

RELATED APPLICATIONS

This application claims priority under 35 U.S.C. Section 120 as a continuation of U.S. patent application Ser. No. 14/330,221 Filed Jul. 14, 2014, which claims priority under 35 U.S.C. Section 120 as a continuation of U.S. patent application Ser. No. 13/270,111, filed Oct. 10, 2011, which claims priority under 35 U.S.C. Section 120 as a continuation of U.S. patent application Ser. No. 12/414,458, filed Mar. 30, 2009, which claims priority under 35 U.S.C. Section 119(e) to U.S. Provisional Patent Applications Nos. 61/107,945, 61/107,935, and 61/107,921, each of which was filed on Oct. 23, 2008, the entire disclosures of each of the applications are hereby incorporated by reference in their entirety.

BACKGROUND

Mobile communication devices (e.g., wireless phones) have become an integral part of everyday life. For example, a user traditionally used a mobile communications device to place and receive telephone calls when the user was away from a fixed communications device, e.g., a house or office wired telephone. In some instances, the mobile communications device became the primary device via which the user communicated with other users as the user became accustomed to the convenience and functionality of the device.

Communication techniques that may be employed using a mobile communications device have also increased. For example, users were traditionally limited to telephone calls between mobile communications devices. Advances were then made to provide a variety of other communication techniques, e.g., text messaging and email. However, inclusion of these additional communication techniques on mobile communications devices having traditional form factors may cause these devices to become unwieldy and less suitable for mobile applications. For example, traditional input devices that were employed by these communication techniques may be less suitable when applied by traditional mobile communications devices.

SUMMARY

Alternative inputs of a mobile communications device are described. In an implementation, a mobile communications device includes a display device having touchscreen functionality, a keyboard having a plurality of physical keys that include a dedicated key and letter keys arranged according to a QWERTY layout, and one or more modules. The one or more modules are configured to output a user interface on the display device responsive to selection of the dedicated key, the user interface having a plurality of portions that are selectable via the touchscreen functionality to cause input of a respective one of a plurality of emoticons.

In an implementation, a determination is made that a physical letter key of a keyboard of a mobile communications device has been selected. If the physical letter key has not been selected for a specified amount of time, a letter is input that corresponds to the physical letter key. If the physical letter key has been selected for a specified amount of time, an alternative input is displayed that includes the letter on the mobile communications device, the display of the alternative input being selectable to cause input of the alternative input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
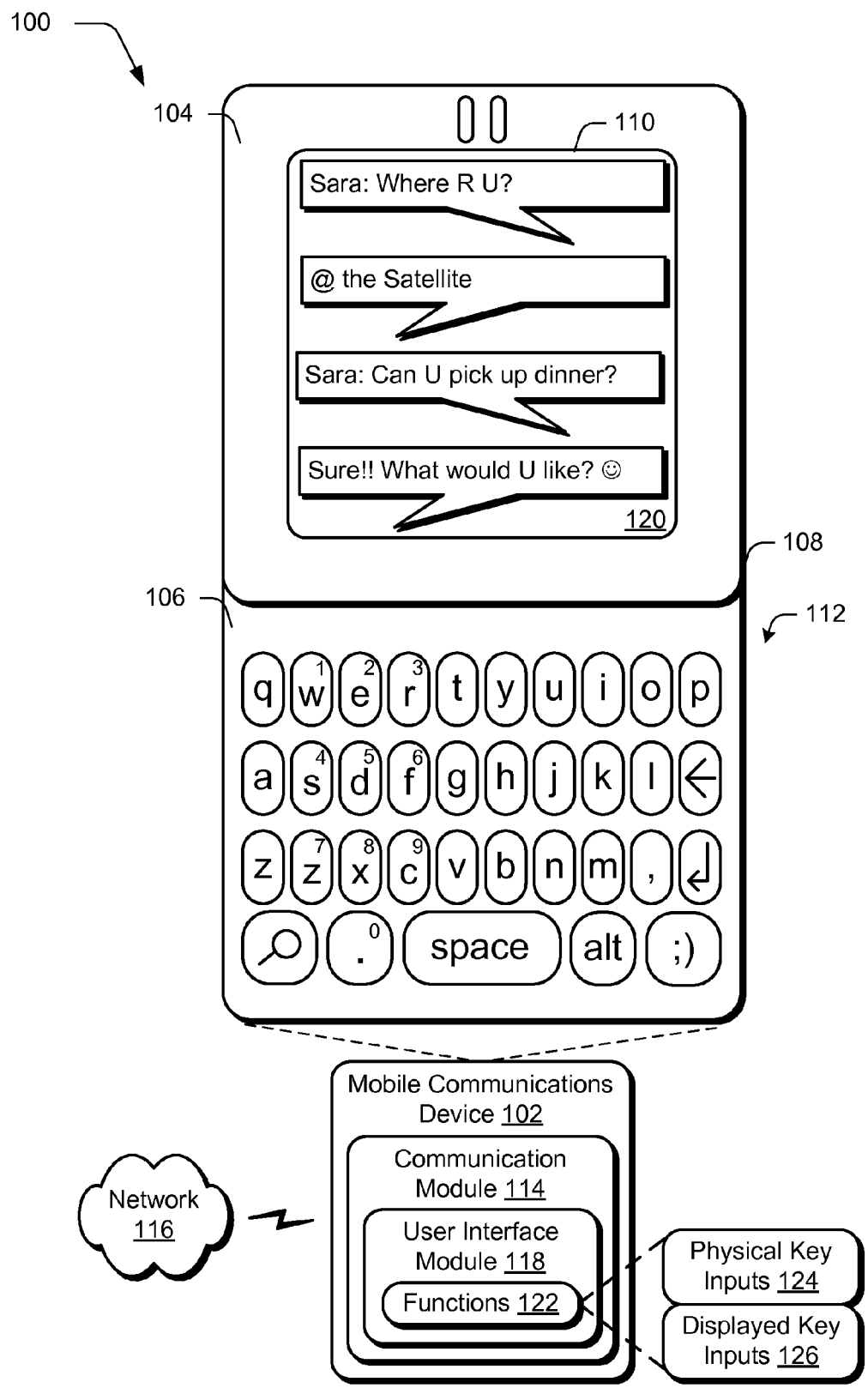
FIG. 1 is an illustration of an example implementation of a mobile communications device in accordance with one or more embodiments of devices, features, and systems for mobile communications.

Users continually desire increased functionality from mobile communications devices, e.g., gaming devices, wireless phones, mobile messaging devices, calendaring devices, and so on. For example, users may maintain a calendar, a list of contacts, send and receive text messages, access the Internet, send and receive email, take pictures, send status message (i.e., status update) of a social network, and so on. However, interaction with this increased functionality in conventional mobile communications devices may be difficult due to traditional form factors that were employed to keep the device "portable", which traditionally resulted in small keys that were difficult to use and/or a large form factor that became less and less portable in order to provide sufficient space for each of the keys of a keyboard.

For example, "QWERTY" keypads on a mobile communications device have a limited amount of space for each of the keys on a standard keyboard, such as keyboard used in a desktop environment to enter Latin characters. As a result, the size of keys and/or the amount of keys included on the device are limited and are typically balanced, e.g., a number of keys and a desired size of the keys.

Consequently traditional manufacturers of QWERTY mobile communications devices (e.g., wireless phones) may load secondary and tertiary functions on a signification portion of the keys, e.g., a majority of the keys. For example, with three functions per key the already small keys may include up to three indicia (e.g., legends) on them to describe each function. Accordingly, loading of the physical keys with secondary and tertiary functions may make the overall keyboard look complex. As such, QWERTY keyboards on traditional mobile communications devices were often considered to be targeted for business and not consumer use. Additionally, inclusion of extended functions on each key may make it harder to find a desired key function, e.g., the desired key function may be buried in a sea of key functions that are not used as much by the user.

In one or more implementations, functionality of a physical keyboard (e.g., a QWERTY keyboard) is combined with a display device (e.g., a touchscreen) to offload alternate functions for input (i.e., alternative inputs) from the physical keypad onto the display device. For example, a dedicated hardware key may be used to load a library of secondary and tertiary functions for display on the display device. For instance, a key labeled with a punctuation smiley face ";)" may be used to load punctuation marks and/or emoticons. Thus, the physical keyboard may be simplified to include primary functions and secondary functions used most often to make these functions easy to access and use from day to day, thereby making a keyboard having increased acceptability in the consumer space.

Additionally, these techniques may be leveraged to increase flexibility of the mobile communications device to provide special characters (e.g., as secondary and/or tertiary functions) for specific localization. For example, characters may be identified that commonly utilized in a specific geographic location. Rather than reconfigure the physical keyboard, these characters may be output for selection by leveraging touch screen functionality of the mobile communications device. Further discussion of leveraging a display device for input of secondary and tertiary functions that are not present on a physical keyboard may be found in relation to FIGS. 2, 3, and 5.

In an implementation, at least one physical key of a keyboard of a mobile communications device is configured to be selectable to load additional functions for that physical key which may or may not be indicated on the physical key. For example, a user may press and hold a key and have accents associated with that key loaded automatically as an extended set of that physical key. In Spanish, for instance, the tilde "~" might be used in conjunction with a letter Ñ in the word SEÑIOR. In order to load the tilde, a user may press and hold the "N" on the keypad to load an extended set of N's with accents on the display device. A user may then select from the extended set, e.g., using a touchscreen or other cursor control device. Thus, clutter on the keyboard of indications of the multiple functions may be reduced yet still make that functionality available to a user. A variety of other examples are also contemplated, further discussion of which may be found in relation to FIGS. 4 and 6.

In the following discussion, a variety of example implementations of a mobile communications device (e.g., a wireless phone) are described. Additionally, a variety of different functionality that may be employed by the mobile communications device is described for each example, which may be implemented in that example as well as in other described examples. Accordingly, example implementations are illustrated of a few of a variety of contemplated implementations. Further, although a mobile communications device having one or more modules that are configured to provide telephonic functionality are described, a variety of other mobile devices are also contemplated, such as personal digital assistants, mobile music players, dedicated messaging devices, portable game devices, and so on.

Example Implementations

FIG. 1 is an illustration of an example implementation 100 of a mobile communications device 102 in accordance with one or more embodiments of devices, features, and systems for mobile communications. The mobile communications device 102 is operable to assume a plurality of configurations, examples of which include a configuration in which the device is "closed" and a configuration illustrated in FIG. 1 in which the device is "open."

The mobile communications device 102 is further illustrated as including a first housing 104 and a second housing 106 that are connected via a slide 108 such that the first and second housings 104, 106 may move (e.g., slide) in relation to one another. Although sliding is described, it should be readily apparent that a variety of other movement techniques are also contemplated, e.g., a pivot, a hinge and so on.

The first housing 104 includes a display device 110 that may be used to output a variety of data, such as a caller identification (ID), information related to text messages as illustrated, email, multimedia messages, Internet browsing, game play, music, video and so on. In the illustrated implementation, the display device 110 is also configured to function as an input device by incorporating touchscreen functionality, e.g., through capacitive, surface acoustic wave, resistive, optical, strain gauge, dispersive signals, acoustic pulse, and other touchscreen functionality.

The second housing 106 is illustrated as including a keyboard 112 that may be used to provide inputs to the mobile communications device 102. Although the keyboard 112 is illustrated as a QWERTY keyboard, a variety of other examples are also contemplated, such as a keyboard that follows a traditional telephone keypad layout (e.g., a twelve key numeric pad found on basic telephones), keyboards configured for other languages (e.g., Cyrillic) and so on.

In the example shown in FIG. 1, the first and second housings 104, 106 of the mobile communications device 102 are approximately squared. For example, a plane defined by an outer surface of the display device 114 may be parallel to a plane of the first housing 104 that approximates a square, which may be the same as or different from the plane defined by the display device 110. In other words, the width and height of the plane taken from the first housing 104 that is parallel to the other surface of the display device 110 is approximately one-to-one. Likewise, the second housing 106 may be considered square along a plane that is parallel to and/or is the same as an outer surface of the keyboard 112 disposed within the second housing 106.

The mobile communications device 102 may assume a "closed configuration" such that the first housing 104 covers the second housing 106 by sliding the housing together using the slide 108. Consequently, the keyboard 112 disposed on the second housing 106 may be covered and made not available to for interaction by a user of the mobile communications device 102. In an implementation, telephonic functionality is still available when the mobile communications device 102 is in the closed configuration, e.g., to receive a telephone call.

In the "open" configuration as illustrated in the example implementation 100 of FIG. 1, the first housing 104 is moved (e.g., slid) "away" from the second housing 106 using the slide 108. In this example configuration, at least a majority of the keys of the keyboard 112 is exposed such that the exposed keys are available for use to provide inputs. The open configuration results in an extended form factor of the mobile communications device 102 as contrasted with the form factor of the mobile communications device 102 in the closed configuration. In an implementation, the planes of the first and second housings 104, 106 that are used to define the extended form factor are parallel to each other, although other implementations are also contemplated.

The form factor employed by the mobile communications device 102 may be suitable to support a wide variety of features. For example, the keyboard 112 is illustrated as supporting a QWERTY configuration. This form factor may be particularly convenient to a user to utilize the previously described functionality of the mobile communications device 102, such as to compose texts, play games, check email, "surf" the Internet, provide status messages for a social network, and so on.

In the mobile communications device 102 of FIG. 1, a portion of the keys of the keyboard 112 are illustrated as sharing multiple functions. For example, a numeric keypad may be provided within physical keys of the QWERTY layout as illustrated by the physical keys "w", "e", "r", "s", "d", "f", "z", "x", "c", and "." as sharing numbers "1", "2", "3", "4", "5", "6", "7", "8", "9", and "0", respectively. The numbers may be accessed by pressing the "ALT" key of the keypad 112. A variety of other examples are also contemplated, an example of which may be found in relation to the following figure.

The mobile communications device 102 is also illustrated as including a communication module 114. The communication module 114 is representative of functionality of the mobile communications device 102 to communicate via a network 116. For example, the communication module 114 may include telephone functionality to make and receive telephone calls. The communication module 114 may also include a variety of other functionality, such as to form short message service (SMS) text messages, multimedia messaging service (MMS) messages, emails, status messages for a social network, and so on. For instance, a user may form a status message for communication via the network 116 to a social network website. The social network website may then publish the status message to "friends" of the user, e.g., for receipt by the friends via a computer, respective mobile communications device, and so on. A variety of other examples are also contemplated, such as blogging, instant messaging, and so on.

The communication module 114 is further illustrated as including a user interface module 118 that is representative of functionality of the mobile communications device 102 to generate, output, and manage a user interface 120 on the display device 110. For example, the user interface 120 is illustrated in FIG. 1 as being configured for SMS text messaging and follows a conversation between a user of the mobile communications device 102 and another user of another mobile communications device via the network 116.

As previously described, conventional loading of the physical keys of a keyboard with secondary and tertiary functions may make the overall keyboard look complex. Additionally, inclusion of indicia of alternative functions on each physical key may make it harder to find a desired key function, e.g., the desired key function may be buried in a sea of key functions. Accordingly, the user interface module 118 may separate functions 122, such as to make a portion of the functions 122 available via physical key inputs 124 and alternate functions available via displayed key inputs 126. In this way, the user interface module 118 may leverage the user interface 120 to provide alternative inputs without cluttering the keyboard 112, further discussion of which may be found in relation to the following figures.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware or a combination of software and firmware. In the case of a software implementation, the module, functionality, or logic represents instructions (e.g., program code) that perform specified tasks when executed on a computing system formed by one or more computers having one or more processors (e.g., CPU or CPUs). The instructions may be stored in one or more tangible computer readable memory devices. The features of the alternative input techniques described below are platform-independent, meaning that the techniques may be implemented on a variety of commercial computing platforms having a variety of processors.

Figure 2:
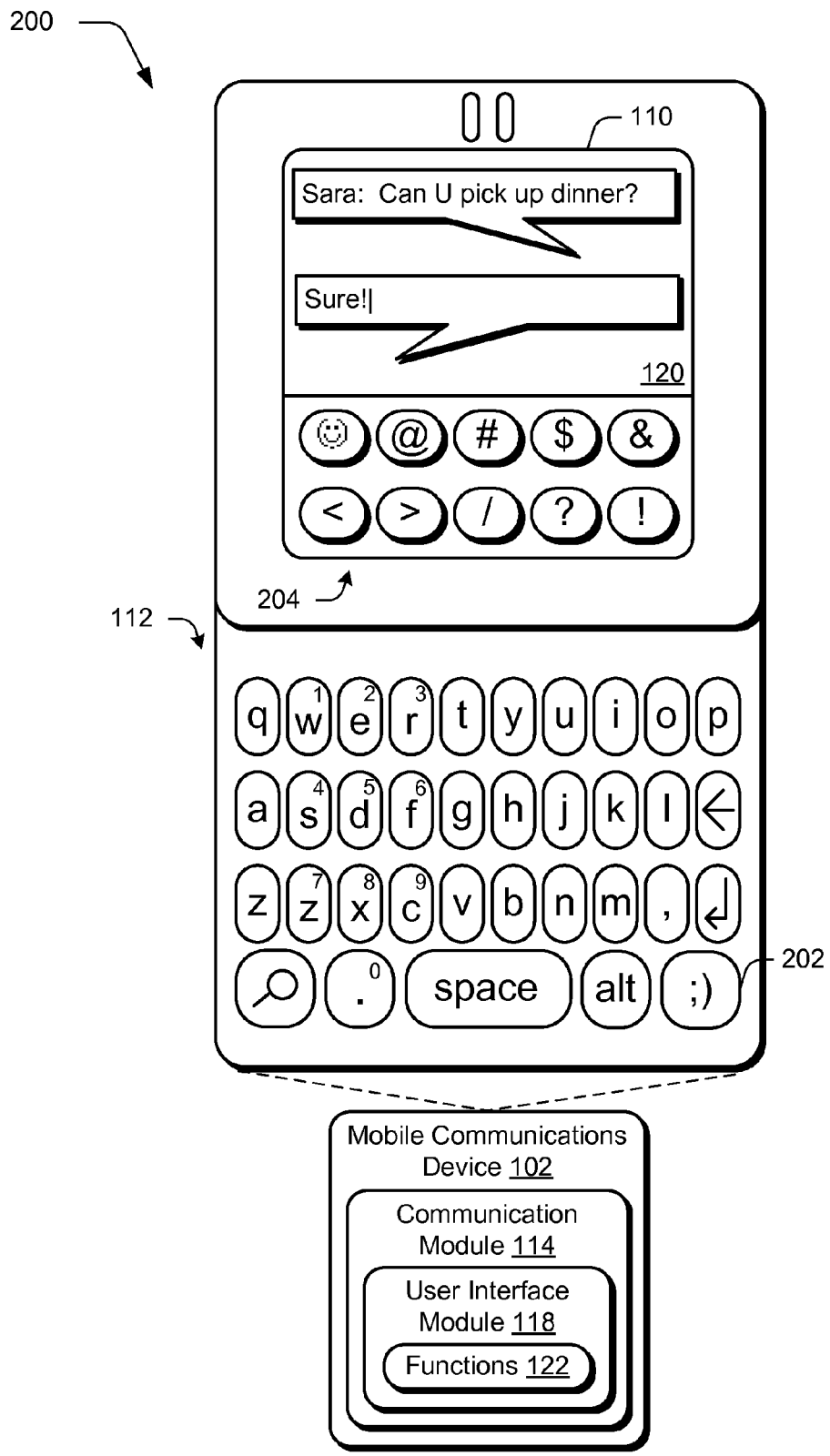
FIG. 2 illustrates an example implementation in which the mobile communications device of FIG. 1 outputs a user interface configured to leverage functionality of a display device for input of alternative functions.

FIG. 2 illustrates an example implementation 200 in which the mobile communications device 102 of FIG. 1 outputs a user interface configured to leverage functionality of the display device for input of alternate functions. The keyboard 112 includes a plurality of physical keys which include letter keys arranged according to a QWERTY layout as previously described.

A subset of the physical keys of the keyboard 112 includes indicia of both letters and numbers that may be entered using that key. For example, the physical keys "w", "e", "r", "s", "d", "f", "z", "x", "c", and "." are illustrated as sharing numbers "1", "2", "3", "4", "5", "6", "7", "8", "9", and "0", respectively. The numbers may input in a variety of ways, such as by pressing an ALT key concurrently with one or more of the keys in the subset. For example, the number "1" may be input by pressing the ALT key and the "w" key that also has indicia of the number "1" marked thereon. Thus, in this example a user may readily provide an input of letters or numbers by interacting directly and exclusively with the keyboard 112.

In the illustrated example, the mobile communications device 102 may be configured to "offload" alternative inputs to the display device 110 for input. For example, a user may select a dedicated physical key 202 (illustrated as including a emoticon formed using punctuation marks) to cause a plurality of portions 204 to be displayed in the user interface 120 to provide alternative inputs. The alternative inputs in the illustrated example include non-alphanumeric characters such as punctuation marks and emoticons. Punctuation marks are symbols other than letters or number used in written language (e.g., ";"). Emoticons represent facial expressions, such as through the use of punctuation marks, e.g., ":)", punctuation marks and letters, e.g., ":p", without punctuation marks, e.g., "☺", and so on.

The portions 204 are illustrated as buttons in this example that may be selected using touchscreen functionality of the display device. For instance, the portions 204 in FIG. 2 include punctuation keys that may be selected to cause a respective input by pressing a finger against the display device 110, using a stylus, and so on. Although touchscreen functionality has been described, a variety of other functionality may also be employed to select functions displayed on the display device 110, such as a cursor control device.

In the illustrated example, the user interface module 118 leverages the display device 110 to "offload" alternative inputs that include punctuation marks via respective punctuation keys, example of which include "@" "#," "$," "&," "<," ">," "/," "?," and "!." The user interface 120 also includes a key that as displayed includes an emoticon "☺." In one example, the display of the key in the user interface 120 may be selected to cause output of the emoticon directly, e.g., by pressing the display device to use touchscreen functionality. In another example, the key may be selected to access a sub-menu having a plurality of emoticons, further discussion of which may be found in relation to the following figure.

Figure 3:
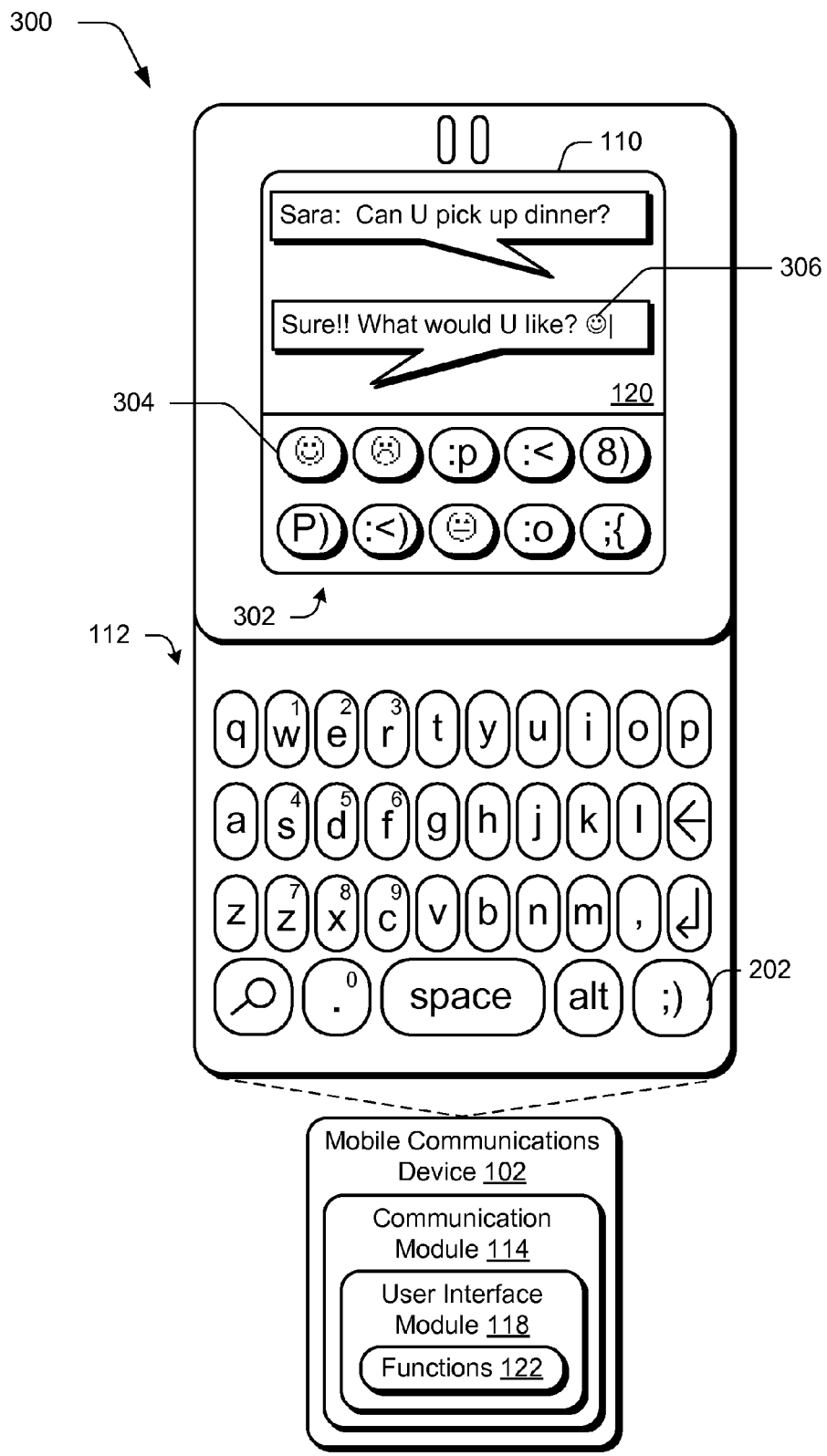
FIG. 3 illustrates an example implementation in which a user interface is configured to provide alternative inputs of a plurality of emoticons, the user interface being output in response to interaction with the user interface of FIG. 2.

FIG. 3 illustrates an example implementation 300 in which a user interface is configured to provide alternative inputs of a plurality of emoticons, the user interface being output in response to interaction with the user interface 120 of FIG. 2. The user interface 120 in this example includes a plurality of portions, each having a respective emoticon that is selectable to cause the respective emoticon to be input. For example, the display of the button 304 having the emoticon "☺" is illustrated as providing an input of "☺" 306 in a SMS text message.

Although the user interface 120 having portions 304 that are selectable to input emoticons was described as a sub-menu that is accessible via the punctuation menu of FIG. 2, a wide variety of other examples are also contemplated. For instance, the physical key 202 having the emoticon may be selected to cause output of the emoticon library directly. In this instance, another physical key may be dedicated to punctuation marks such that selection of this other physical key may cause the illustrated punctuation library of FIG. 2 to be output directly.

Thus, as described in FIGS. 2-3, functionality of physical keys of a keyboard 112 (e.g., a QWERTY keyboard) may be combined with the display device 110 (e.g., a touchscreen) to offload selected secondary and tertiary functions from the keyboard 112 onto the display device 110. Thus, the physical keyboard 112 may be simplified to include primary functions and secondary functions that are used most often to make these functions easy to access and use from day to day. Although a few examples of offloaded functions are described, it should be readily apparent that a variety of different functions may be offloaded without departing from the spirit and scope thereof, further discussion of which may be found in relation to the following figure.

Figure 4:
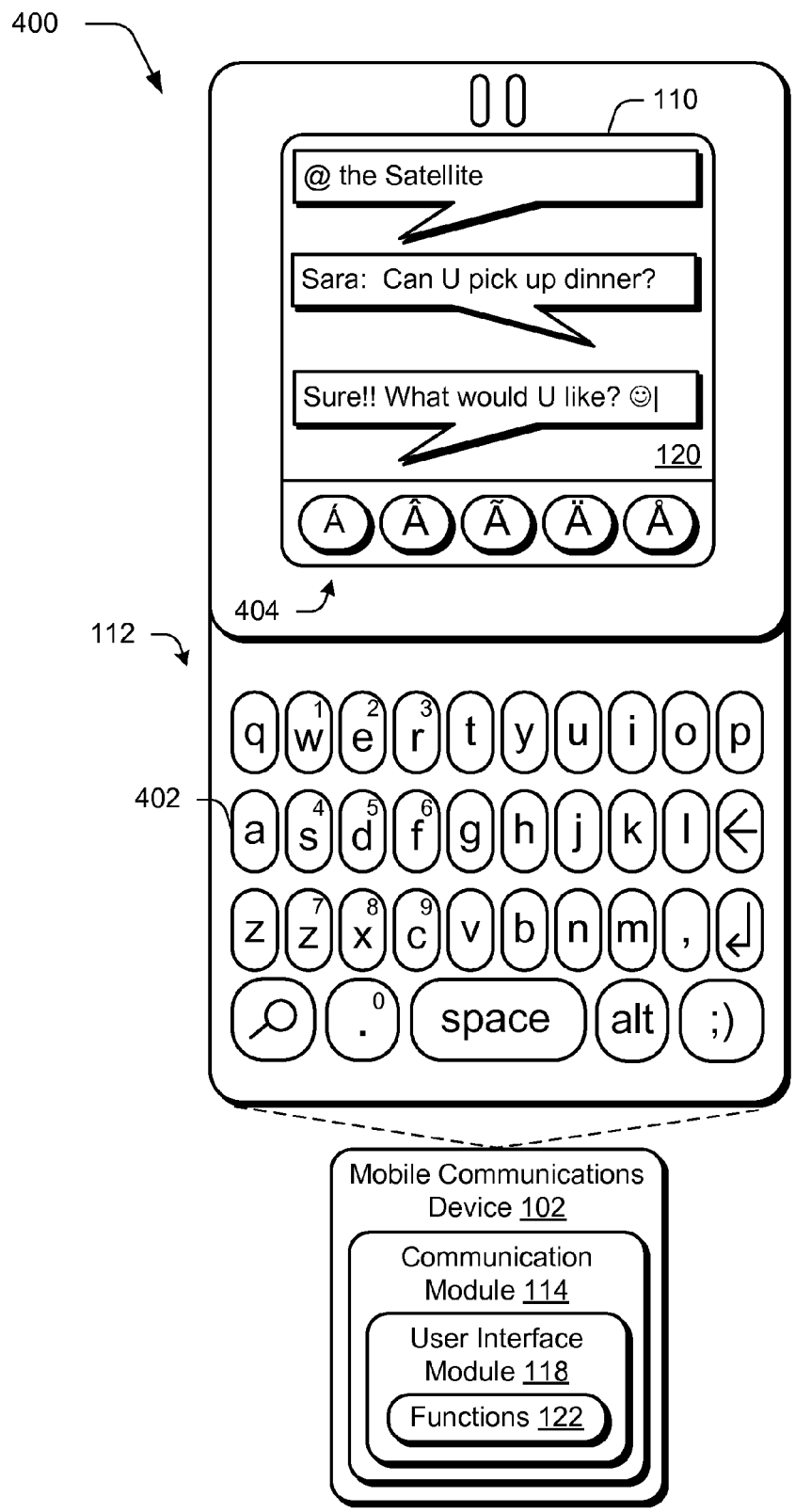
FIG. 4 illustrates an example implementation in which alternative inputs are displayed on a display device responsive to selection of a physical key of the mobile communications device of FIG. 1 that relate to a primary function of the physical key.

FIG. 4 illustrates an example implementation 400 in which alternative inputs are displayed on a display device responsive to selection of a physical key of the mobile communications device 102 of FIG. 1 that relate to a primary function of the physical key. For example, a physical key 402 of the keyboard 112 includes indicia indicating a letter "a". Therefore, the primary function of the physical key 402 is to enter the letter "a" when selected by a user without being selected in combination with another physical key, e.g., the ALT key.

In an implementation, the user interface module 118 may be configured such that alternative inputs are displayed that relate to a particular physical key if the physical key is selected for a specified amount of time. For example, the user may "hold down" the physical key 402 for two seconds, which may cause the user interface module 118 to display alternative inputs 404 that relate to the primary function of the physical key 402 in the user interface 120. In the illustrated instance, the relationship between the primary function and the alternative inputs is that the alternative inputs include a letter that is the primary function, which is shown through different combinations of the letter "a" with symbols that represent accents to be applied to the letter "a".

In another example, a user may press and hold a key and have accents associated with that key loaded automatically as an extended set of that physical key. In Spanish, for instance, the tilde "~" might be used in conjunction with a letter Ñ in the word "SEÑIOR." In order to load the tilde, a user may press and hold the "N" on the keypad to load an extended set of N's with accents on the display device 110. A user may then select from the extended set, e.g., using a touchscreen or other cursor control device. Thus, clutter on the keyboard 112 of indications of the multiple functions may be reduced yet still make that functionality available to a user. A variety of other examples are also contemplated, further discussion of which may be found in relation to FIG. 6.

Example Procedures

The following discussion describes alternative input techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the implementations 200, 300, 400 of FIGS. 2-4, respectively.

Figure 5:
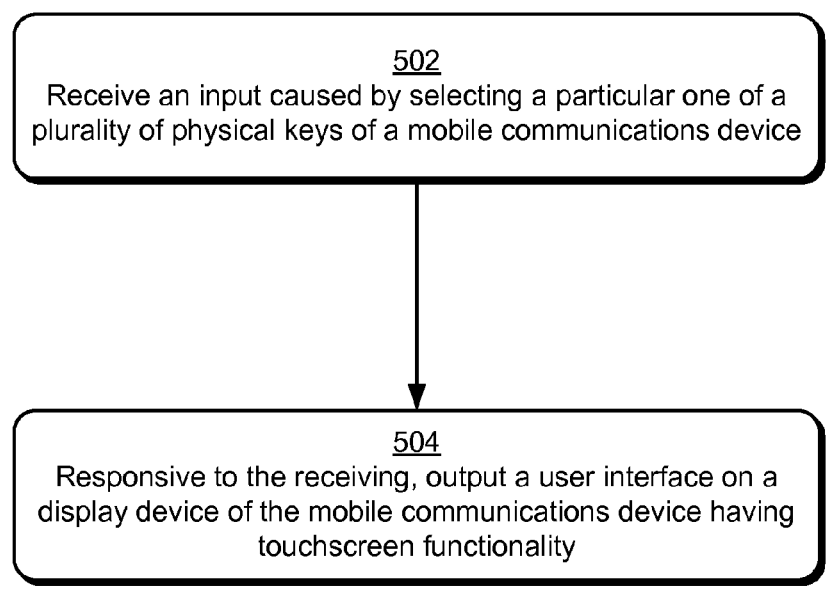
FIG. 5 is a flow diagram depicting a procedure in an example implementation in which a user interface is output to display alternative inputs.

FIG. 5 depicts a procedure 500 in an example implementation in which a user interface is output to display alternative inputs. An input is received that is caused by selecting a particular one of a plurality of physical keys of a mobile communications device (block 502).

Responsive to the receiving, a user interface is output on a display device of the mobile communication device having touchscreen functionality (block 504). The user interface includes a plurality of punctuation keys, each being selectable via the touchscreen functionality to cause input of a respective one of a plurality of punctuation marks. At least one key is displayed in the user interface and is selectable via the touchscreen functionality to cause a plurality of emoticon keys to be output in the user interface. Each of the emoticon keys are selectable to cause input of a respective one of a plurality of emoticons. As previously described emoticons may be configured to convey emotions, such as by mimicking facial expressions.

Figure 6:
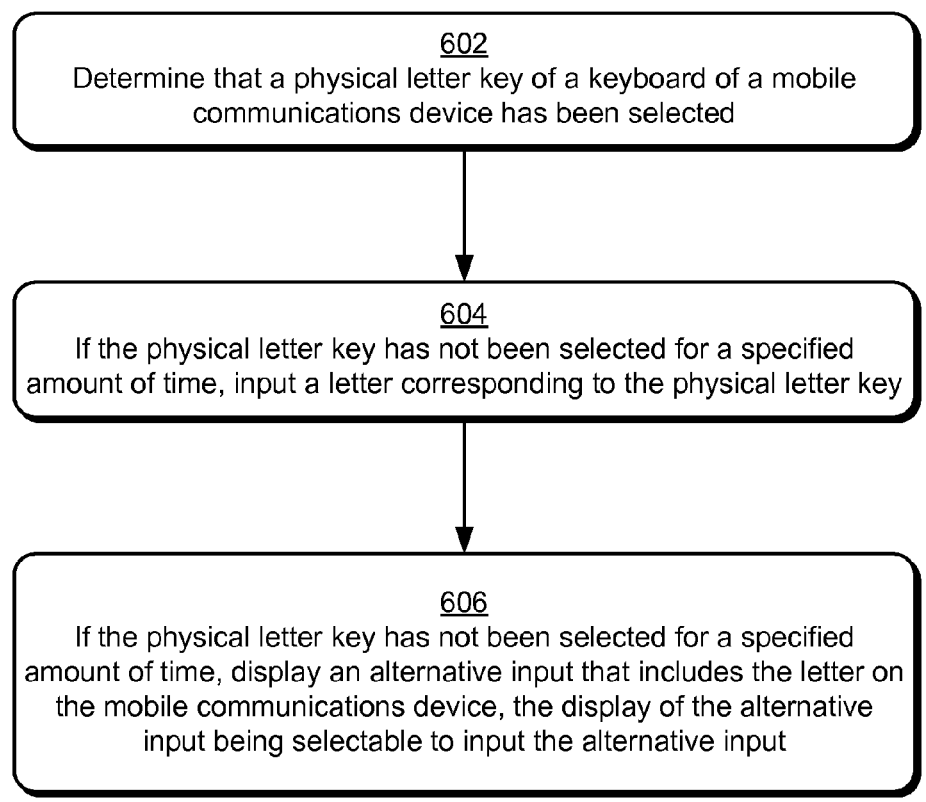
FIG. 6 is a flow diagram depicting a procedure in an example implementation in which alternative inputs are output in a user interface that correspond to a letter of a physical letter key.

FIG. 6 depicts a procedure 600 in an example implementation in which alternative inputs are output in a user interface that correspond to a letter of a physical letter key. A determination is made that a physical letter key of a keyboard of a mobile communications device has been selected (block 602). For example, the physical key 402 "a" of FIG. 4 may be configured to provide a primary input of a letter "a" and therefore may be referenced as a physical letter key.

If the physical letter key has not been selected for a specified amount of time a letter is input that corresponds to the physical letter key (block 604), such as a letter "a" for the physical key 402 in the previous example.

If the physical letter key has not been selected for a specified amount of time, an alternative input is displayed that includes the letter on the mobile communications device, the display of the alternative input being selectable to input the alternative input (block 606), such as to include one or more accents with the letter in the user interface 120. A variety of other examples are also contemplated.

Example Device

Figure 7:
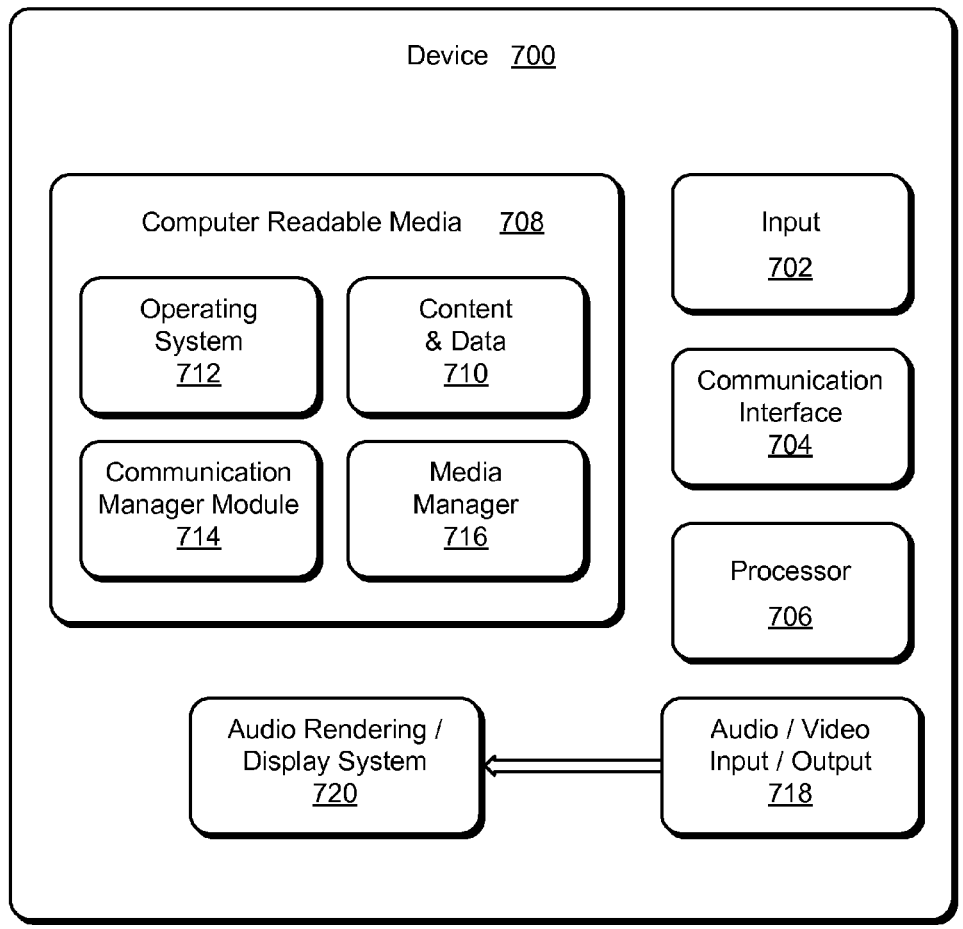
FIG. 7 illustrates various components of an example device that can be implemented in various embodiments as any type of a mobile device to implement embodiments of devices, features, and systems for mobile communications.

FIG. 7 illustrates various components of an example device 700 that can be implemented in various embodiments as any type of a mobile device to implement embodiments of devices, features, and systems for mobile communications. For example, device 700 can be implemented as any of the mobile communications devices 102 described with reference to respective FIGS. 1-4. Device 700 can also be implemented to access a network-based service, such as a content service.

Device 700 includes input(s) 702 that may include Internet Protocol (IP) inputs as well as other input devices, such as the keyboard 112 of FIGS. 1-17. Device 700 further includes communication interface(s) 704 that can be implemented as any one or more of a wireless interface, any type of network interface, and as any other type of communication interface. A network interface provides a connection between device 700 and a communication network by which other electronic and computing devices can communicate data with device 700. A wireless interface enables device 700 to operate as a mobile device for wireless communications.

Device 700 also includes one or more processors 706 (e.g., any of microprocessors, controllers, and the like) which process various computer-executable instructions to control the operation of device 700 and to communicate with other electronic devices. Device 700 can be implemented with computer-readable media 708, such as one or more memory components, examples of which include random access memory (RAM) and non-volatile memory (e.g., any one or more of a read-only memory (ROM), flash memory, EPROM, EEPROM, etc.).

Computer-readable media 708 provides data storage to store content and data 710, as well as device applications and any other types of information and/or data related to operational aspects of device 700. For example, an operating system 712 can be maintained as a computer application with the computer-readable media 708 and executed on processor(s) 706. Device applications can also include a communication manager module 714 (which may be used to provide telephonic functionality) and a media manager 716.

Device 700 also includes an audio and/or video output 718 that provides audio and/or video data to an audio rendering and/or display system 720. The audio rendering and/or display system 720 can be implemented as integrated component(s) of the example device 700, and can include any components that process, display, and/or otherwise render audio, video, and image data. Device 700 can also be implemented to provide a user tactile feedback, such as vibrate and haptics.

The communication manager module 714 is further illustrated as including a keyboard module 722. The keyboard module 722 is representative of functionality employ one or more of the techniques previously described in relation to FIGS. 1-6.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A device comprising:
   a touchscreen display;
   a keyboard comprising physical keys that include a dedicated key and letter keys arranged according to a QWERTY layout; and
   a processor configured to display a library for display as at least part of a user interface on the touchscreen display responsive to selection of the dedicated key, wherein the user interface comprises a plurality of portions that are selectable via the touchscreen display to cause selection of an application in the library.

2. The device as described in claim 1 wherein the touchscreen display is a capacitive touchscreen display.

3. The device as described in claim 1 wherein the application is a multimedia application.

4. The device as described in claim 1, the processor further configured to execute the application in response to selection of the application in the library.

5. The device as described in claim 1 wherein each of one or more of the letter keys includes indicia on the physical key of a respective letter for input via the physical key.

6. The device as described in claim 1 wherein the device is a mobile communications device.

7. A device comprising:
   a touchscreen display;
   a keyboard comprising physical keys that include a dedicated key and letter keys arranged according to a QWERTY layout; and
   a processor configured to:
      in response to selection of the dedicated key, display a library on the touchscreen display;
      receive a selection of an item in the library; and
      execute a function in response to the receiving the selection.

8. The device of claim 7 wherein the item comprises the function.

9. The device of claim 8 wherein the function causes execution of an application.

10. The device of claim 7 wherein the item comprises an icon.

11. The device of claim 7 wherein the touchscreen display is a capacitive touchscreen display.

12. The device of claim 7 wherein the application relates to game play, music, or video.

13. The device of claim 7 wherein each of one or more of the letter keys includes indicia on the physical key of a respective letter for input via the physical key.

14. A method comprising:
   receiving a signal indicative of an activation of a dedicated key, the dedicated key located on a keyboard comprising physical keys that include the dedicated key and letter keys arranged according to a QWERTY layout;
   in response to the signal, displaying a library on a touchscreen display;
   receiving a selection of an item in the library; and executing a function in response to the receiving the selection.

15. The method of claim 14 wherein the item comprises the function.

16. The method of claim 15 wherein the function causes execution of an application.

17. The method of claim 14 wherein the item comprises an icon.

18. The method of claim 14 wherein the touchscreen display is a capacitive touchscreen display.

19. The method of claim 14 wherein the touchscreen display is an optical touchscreen display.

20. The method of claim 14 wherein each of one or more of the letter keys includes indicia on the physical key of a respective letter for input via the physical key.

* * * * *